United States Patent [19]

Ako et al.

[11] Patent Number: 5,044,143

[45] Date of Patent: Sep. 3, 1991

[54] METHOD AND APPARATUS FOR PACKING FLEXIBLE PACKAGES

[75] Inventors: Shigeichi Ako, New South Wales, Australia; Kazuyoshi Fujio, Nishi-Sonogi; Shuzo Takeuchi, Sasebo, both of Japan

[73] Assignees: S.S.A. Packaging Engineering & Consultant Pty. Ltd., Woolooware, Australia; Matsusima Electrical Machinery Co., Ltd., Fukuoka, Japan

[21] Appl. No.: 524,742

[22] Filed: May 17, 1990

[30] Foreign Application Priority Data

May 19, 1989 [JP] Japan .................................. 1-124614
Apr. 16, 1990 [JP] Japan .................................... 2-97560

[51] Int. Cl.$^5$ .......................... B65B 5/08; B65B 35/38; B65B 35/44
[52] U.S. Cl. ........................................ 53/448; 53/475; 53/536; 53/537; 53/247
[58] Field of Search ................. 53/536, 537, 538, 247, 53/527, 564, 374, 443, 447, 258, 467, 468, 475, 491, 448

[56] References Cited

U.S. PATENT DOCUMENTS

| 3,338,009 | 8/1967 | Stevens | 53/536 X |
| 3,509,688 | 5/1970 | Hartbauer et al. | 53/536 |
| 3,512,336 | 5/1970 | Rosecrans | 53/537 |
| 3,778,965 | 12/1973 | O'Lenick et al. | 53/258 X |
| 3,834,115 | 9/1974 | Johnson et al. | 53/537 X |
| 3,996,723 | 12/1976 | Greenwell | 53/537 X |
| 4,213,285 | 7/1980 | Mancini | 53/564 X |
| 4,611,458 | 9/1986 | Prakken | 53/537 |
| 4,642,975 | 2/1987 | Langen et al. | 53/564 |
| 4,648,237 | 3/1987 | Total | 53/247 X |
| 4,776,148 | 10/1988 | Mingozzi | 53/564 X |
| 4,800,703 | 1/1989 | Goodman | 53/247 X |
| 4,862,677 | 9/1989 | Roberts et al. | 53/537 X |

Primary Examiner—Horace M. Culver
Attorney, Agent, or Firm—Fleit, Jacobson, Cohn, Price, Holman & Stern

[57] ABSTRACT

A method and apparatus for packing flexible packages, comprises separating and aligning the packages (5) transversely from a single feeding line (11) into plural lines (12), centralizing the packages so as to overlap each other partially (13), subsequently, lifting up the packages in centralizing state through vacuum pads (1), and placing them into an open top outer cartons without dropping the packages by gravity so that they are arranged in tiers as stacked in the cartons.

9 Claims, 24 Drawing Sheets

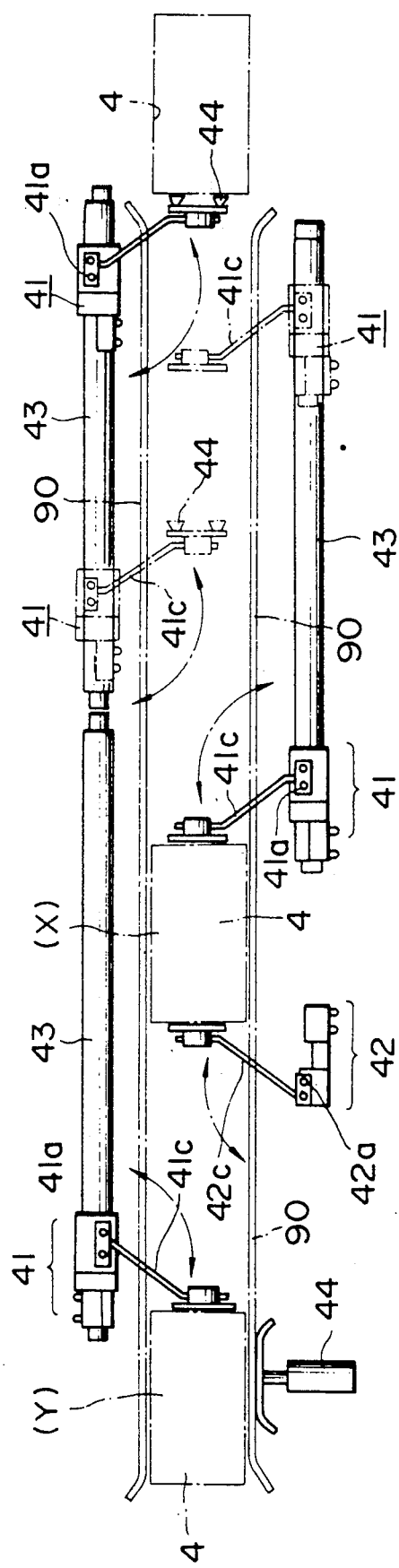

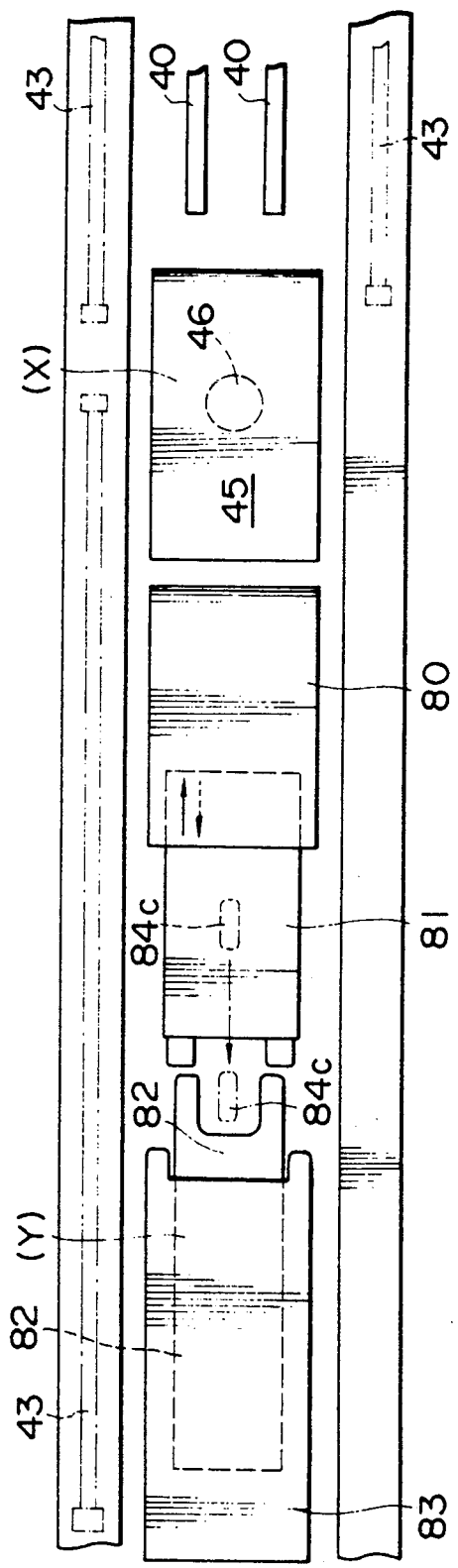

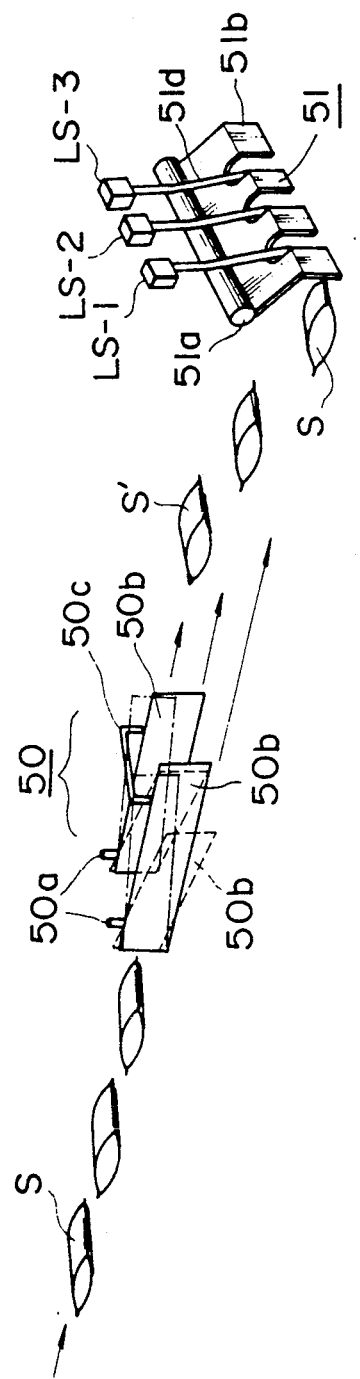

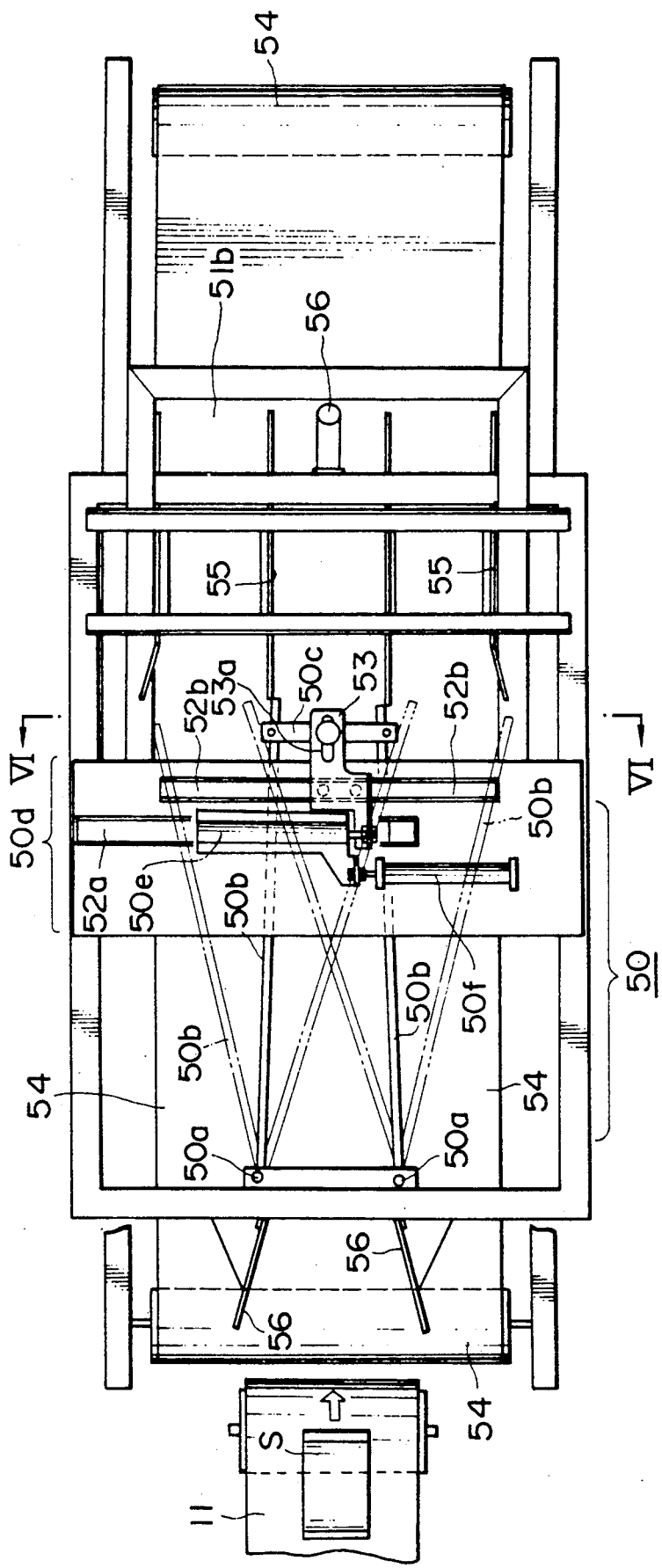

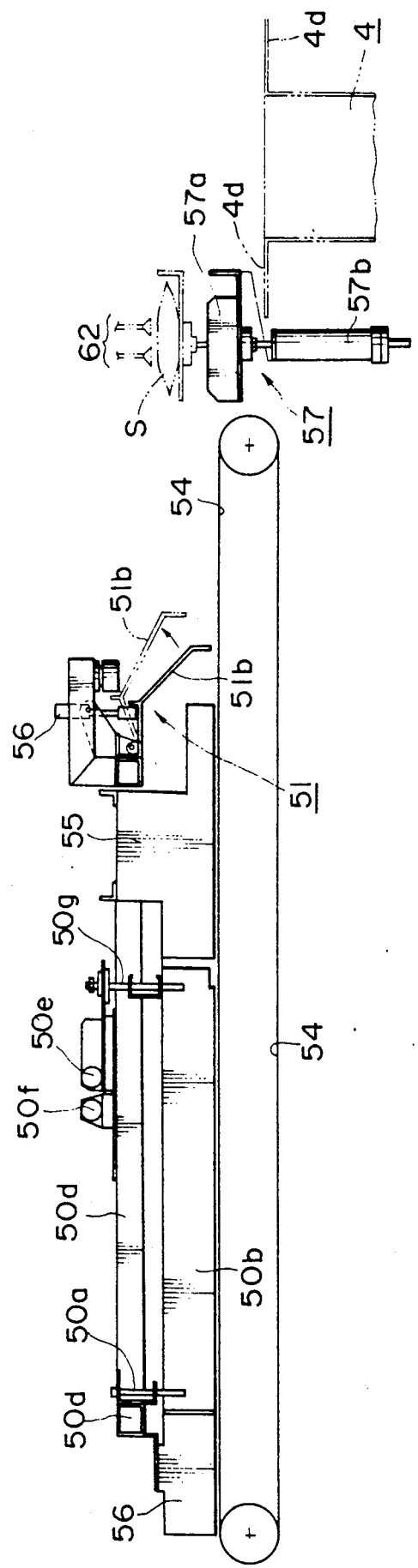
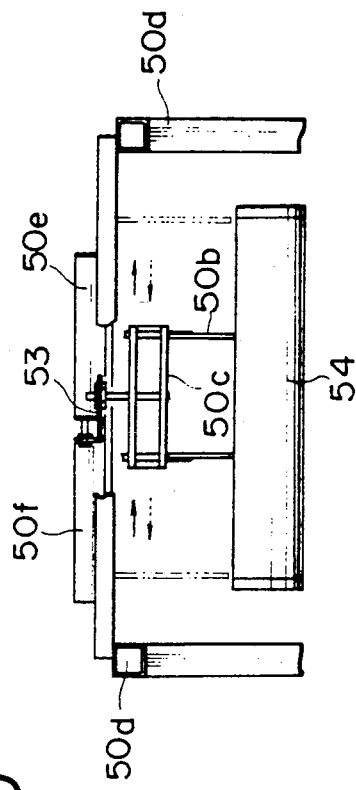
FIG.6C
FIG.6D (1) (2) (3) (4)

(5) (6) (7) (8)

(9) (10) (11) (12)

(13) (14) (15) (16)

METHOD AND APPARATUS FOR PACKING FLEXIBLE PACKAGES

BACKGROUND OF THE INVENTION

1. Field of the Invention

The present invention relates to a method and apparatus for packing bagged products, or more precisely a method and apparatus for automatically packing so called flexible packages containing snack foods or the like (hereinafter referred to as "bags") into a container while bags are in condition to be aligned and overlap each other partially.

2. Prior Art

When transporting, storing or handling bags, it is necessary to pack a set quantity of bags into a container such as a corrugated carton. Although packing bags in a carton or the like has been universal, it is a fact that no satisfactory method or apparatus for packing bags is known or developed with a view to protecting the contents, as will now be described.

There are many problems in packaging and packing bags, especially bags of snack foods or the like, since snack foods such as potato chips, pop corn, corn chips or the like have the common characteristic that they can be easily damaged, absorb moisture, their flavour may be changed, etc. In particular, that they can be easily damaged presents the biggest problem. To be more precise, since snack food packages are not even in shape with concavo-convex and they have a large surface area, the likehood of the contents being damaged during the time from when products have been shipped from manufacturers to when they reach consumers through various kinds of distribution passages, thereby consequent deterioration of commodity value can frequently occur.

To prevent this from happening at the present time a certain amount of air, nitrogen gas or the like, is enclosed with the bag together with the contents, when bagging the products. However, bags in which air or gas is enclosed together with goods are bulky and packing of such balloon-like bags into a carton can only be carried out manually, since these bags need to be partially overlapped when packing. In addition, a bag within which air or gas is enclosed gradually shrinks and reduces size thereof with the decreasing temperature of said products after packing. Furthermore, it is inevitable that air or gas enclosed in a bag, although it depends on air tightness or sealing capability thereof, gradually leaks during the duration of distribution thereof. Under the above mentioned circumstances, the size of the bag is gradually reduced, after being packed, and gaps between bags within the carton frequently occur.

Presently apparatus for packing bags automatically is conventionally known; for example, see Japanese Laid Open Publication Nos. Showa 59-134105 or Showa 60-23105. However, since that invention relates to a method of packing bags into a carton one by one to be overlapped with each other partially through a belt conveyor, therefore, it is neither efficient to handle a large number of bags at a time nor suitable for handling many bags at high speed. Moreover, the former invention was developed for packing relatively heavy goods such as "instant" fresh noodles, and therefore is not suitable for packing flexible packages because flexible packages are light weight and tend to suspend by air resistance when an attempt is made to drop packages in a set position, resulting in dislocation.

On the other hand, in the latter apparatus, using a motion arm equipped with vacuum pads, bags fed by a loading conveyor are transmitted onto a carton while by the arm keeping suction, and drops the bags into a carton by releasing suction of the pads. This method requires a bigger carton since a bag drops aslant if even a corner of the bag touches the edge of the carton. This results in a gap between bags after packing.

For the reasons of efficiency and economy, it is desirable to pack bags as tightly as possible into a carton in order to avoid gaps between bags especially when bags reduce their size after being packed and shrunk. However it is not able to carry out such tight packing and consequently there is no choice but to do it manually.

Recently a method has been proposed that uses an actuator like a robot affixed with vacuum pads, and the plural bags fed by a belt conveyor are picked up by the vacuum pads, turned to one side or transfered horizontally, and then the actuator is lowered to pack the bags into a carton. However, in this method, it is necessary to have 3 discontinuous motions for picking up, lowering down and turning bags by an actuator, resetting in inconvenience with extremely slow operational speed, and therefore it has inferior operation efficiency.

SUMMARY OF THE INVENTION

The present invention makes it possible that, for packing the above mentioned flexible packages (bags) into a container such as a carton or the like, making plural bags to be aligned transversely under the condition of overlapping partially from the beginning, packing bags into carton forcibly so as to retain them through a contacting plate, and conversely, elevation movable support plate stand by in the carton so as to receive bags quietly by supporting them from underneath being inserted from above, thereby it precludes bags from giving impact by dropping. Also the present invention is to provide an apparatus that a plural number of bags aligned transversely under the condition of partially overlapped are directly holden by vacuum pads which are movable in elevationally and horizontally, holdings are directly inserted into an open top carton whereby vacuum of the vacuum pads are released in the vicinity of the loading position of the bags in the carton, thereby said elevation movable support plate is not necessary to be used. As such above, at the time of packing said bags into a carton, they can be packed neatly within a carton without reflection to those even if the end of said bags touch to the flip top of the carton.

In the method for packing bags in accordance with this invention, the bags are firstly formed in plural lines along a direction of progression, they are held by suction by vacuum pads simultaneously, they converged to the center keeping inclined with neighbouring bags being partially overlapped, they are transmitted to be above position of carton, and finally packed into the carton.

Furthermore, this invention include a method and apparatus to convert the flow of bags from single line to multiple lines on the way of transportation, and a method and apparatus to seal a carton after packing of bags into the carton is completed.

The first object of this invention is to provide a method and apparatus that makes it possible to pack flexible packages, enclosed with air or gas, tightly in a carton with packages partially overlapped. The second object is to pack bags tightly in a carton, thus eliminating unwanted gaps between bags are reduced, even if the size of bags is reduced because of leakage of air or gas from the bags. The third object of this invention is that many bags can be packed in a carton within a short time by operating the packing apparatus at higher speeds than conventional machines.

BRIEF DESCRIPTION OF THE DRAWINGS

The objects and features of the invention may be understood by the following detailed description of illustrative embodiments of the invention, with reference to the accompanying drawings wherein:

FIG. 5A is a view similar to FIG. 4A showing an entire arrangement of a main driving unit of the carton loading mechanism of FIG. 4A;

FIG. 5C is a partial enlarged view of FIG. 4A showing, in the loading mechanism means for supporting the bottom of a carton and means for folding bottom dust flaps of the carton;

FIG. 6A is a schematic diagram to explain how the bags fed in single line are separated and converted to plural lines;

FIG. 6B is a top plan view of the separator to carry out the operations of FIG. 6A;

FIG. 6C is a side elevational view of the separator of FIG. 6B;

FIG. 6D is a cross-sectional view taken along line VI—VI of FIG. 6B;

FIGS. 8A to 8E show an another embodiment of an apparatus of centralizer to make bags to be partially overlapped transversely from plural lines, and while centralized bags are sucked, they are transmitted to the position onto the open top of carton and packed therein; whereas, FIG. 8A is an isometric view, FIG. 8B is an elevational view, FIG. 8C is a side elevational view of the apparatus to pack the bags, FIG. 8D is an elevational view showing elevation movable mechanism, and, FIG. 8E is a plan view showing an arrangement of vacuum pads;

DESCRIPTION OF THE PREFERRED EMBODIMENTS

Figure 1A:
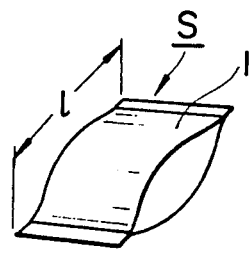
FIG. 1A is a perspective view of a bag suitable to be handled by this invention.
Figure 1B:
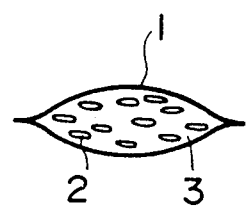
FIG. 1B is a longitudinal cross-sectional view of the bag of FIG. 1A.
Figure 2A:
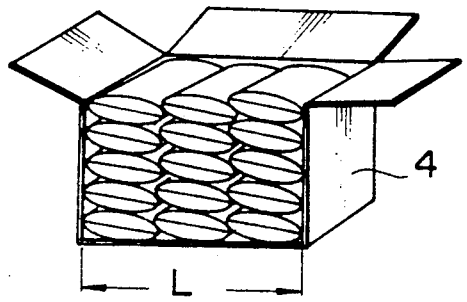
FIG. 2A is a perspective view of bags packed in a carton (the front part of the carton having omitted for explanation purposes)

By reference to the accompanying drawings, embodiments of this invention will be explained in detail. FIGS. 1A, 1B show an example of bag 1 made from material with good gas barrier properties; for example aluminum vacuum metalized plastic film is packed with snack foods 2, and air 3 is enclosed therein during the bagging thereof. The length of the bag is designated by 1, and the length of corrugate carton is designated by L as an outer case in which the bags are to be packed. In this invention, for example, three bags are aligned in transverse direction and overlapped partially so that they are packed in the carton arranged in tiers stepwisely vertically in the carton, as shown in FIG. 2A.

Figure 2B:
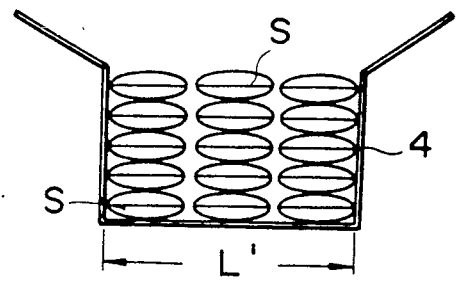
FIGS. 2B and 2C are schematic sectional views of cartons illustrating typical packing problems frequently encountered when using conventional apparatus.
Figure 2C:
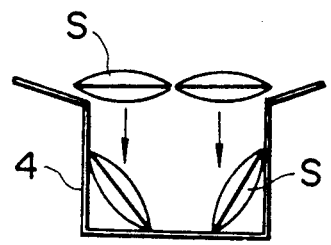

The aforementioned conventional methods cause problems such as for example, gaps between bags S within a carton occur or bags are loosely packed in a carton as shown in FIG. 2B. Bags are often dropped and placed in a wrong position within a carton if the bags touch the upper edge of the carton as shown in FIG. 2C. When packing three bags horizontally, the existing art requires $L'>3l$. The present invention enables the dimension to be $L<3l$. Therefore, according to the present invention, the carton size to pack the bags can be smaller compared with the conventional one. In other word, the carton shown in FIG. 2A can be smaller than the one shown in FIG. 2B in the developed dimension, which means much saving in material cost.

Figure 3A:
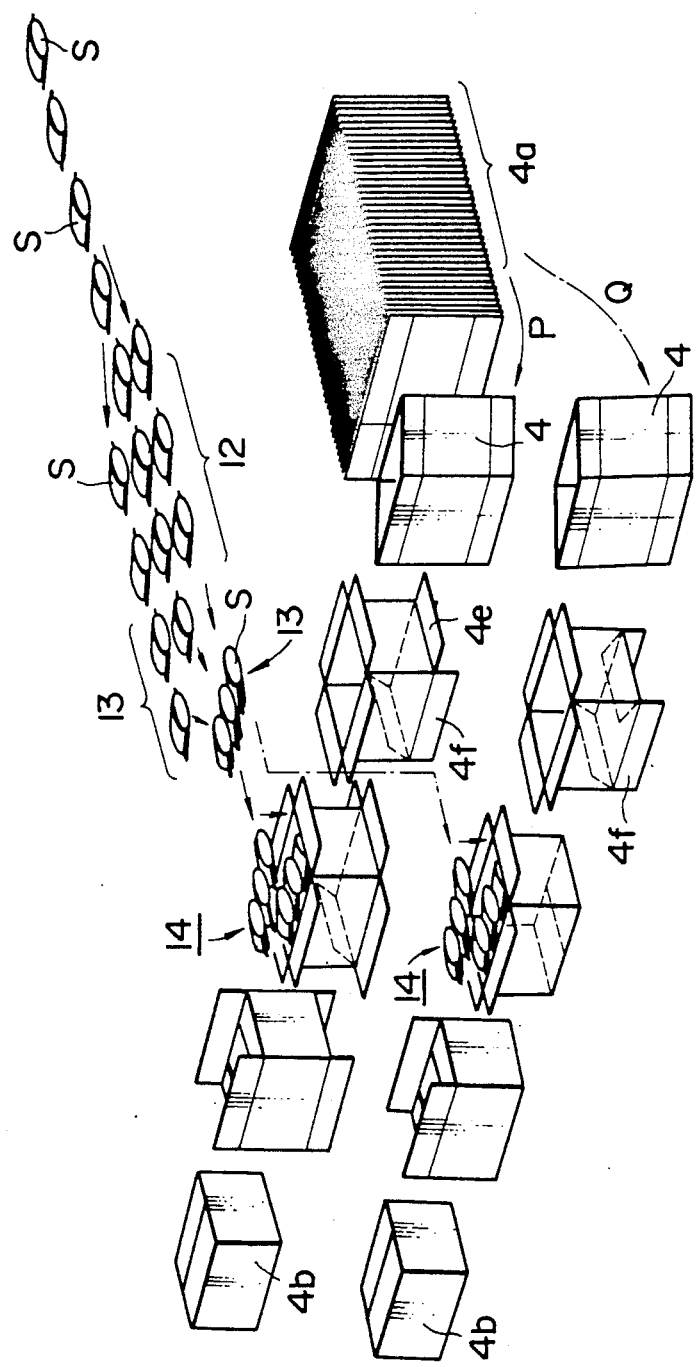
FIG. 3A is a perspective schematic view showing bags being fed in one line then converted to 3 lines and being packed in a carton after being partially overlapped, and a process in which flattened cartons are assembled and bags are packed in the cartons.
Figure 3B:
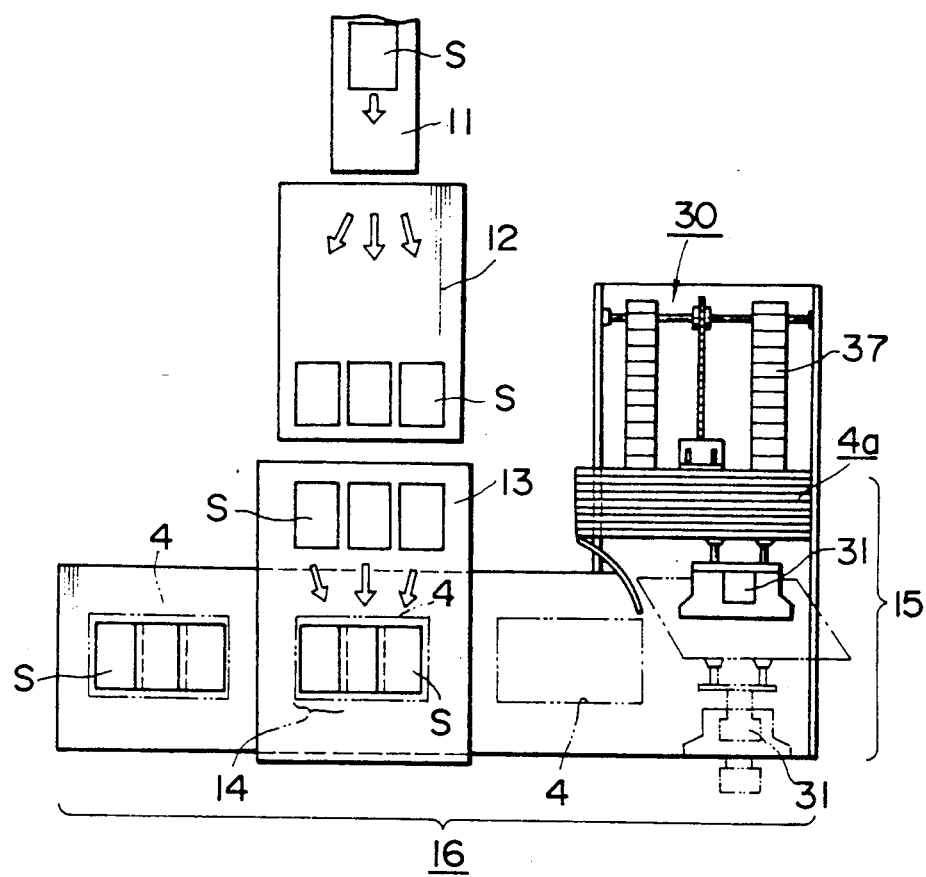
FIG. 3B is a top plan view of FIG. 3A.

FIGS. 3A and 3B are schematic diagrams illustrating an embodiment of this invention. To start with, the general arrangement will be explained, for example, bags (hereinafter also called products S) fed by belt conveyor 11 in a single line are introduced to separator 12 which converts the flow of products S into three lines, and subsequently the products are fed to centralizer 13 where the products are made to partially overlap each other. At the unloading end of the centralizer, products inserting unit 14 is provided, which are shown in FIGS. 7A-7D and 8A-8E, but not shown in FIGS. 3A-3B, and which enable the products to be placed in the carton forcibly while retaining them so as to press them from above softly with products being aligned transversely and partially overlapped. As explained later, in the carton, a support plate is provided to stand by to support products from underneath with variable height thereof in compliance with the stacked height of products in the carton.

Also another embodiment of the apparatus shown in FIGS. 8A to 8E is disclosed herein, which without using such support plate, enables products to pack into bottom closed carton directly, and wherein the height of the vacuum pads which hold products can be varied depending upon the stacked height of products in the carton.

As shown in FIG. 3B, the above mentioned apparatus is connected to automatic carton assembler 15, and carton loading mechanism 16 which transfers sub-assembled cartons to exact position below the products inserting unit. In FIGS. 3A and 3B, the reference numeral 4a indicates the stacking of flex carton sheets and the numeral 4b indicates the state of the carton after products are packed therein and flaps are closed. In FIG. 4C, the reference numerals attached to the carton after being assembled will be explained as follows; of the four flaps extending from the upper part of the carton, the numeral 4c indicates upper dust flaps which are perpendicular to the direction of progression; upper side flaps 4d are located next to flaps 4c and are parallel to the direction of progression of products. Similarly among flaps extending underneath, flaps perpendicular to the direction of progression of products are bottom dust flaps 4e and flaps along the direction of progression are bottom side flaps 4f.

The details of each part of the apparatus will now be explained by reference to the drawings. Even though this invention relates to a method and apparatus for packing a number of bags into a carton, a carton assembler 15, and carton loading mechanism 16 to transfer sub-assembled carton will be briefly explained so as to provide a better understanding of the environment to which the invention is applicable. Then separator 12 which is connected to belt conveyor 11, centralizer 13 and product inserting unit 14 will be explained.

ASSEMBLING OF CARTON BOX

Figure 4A:
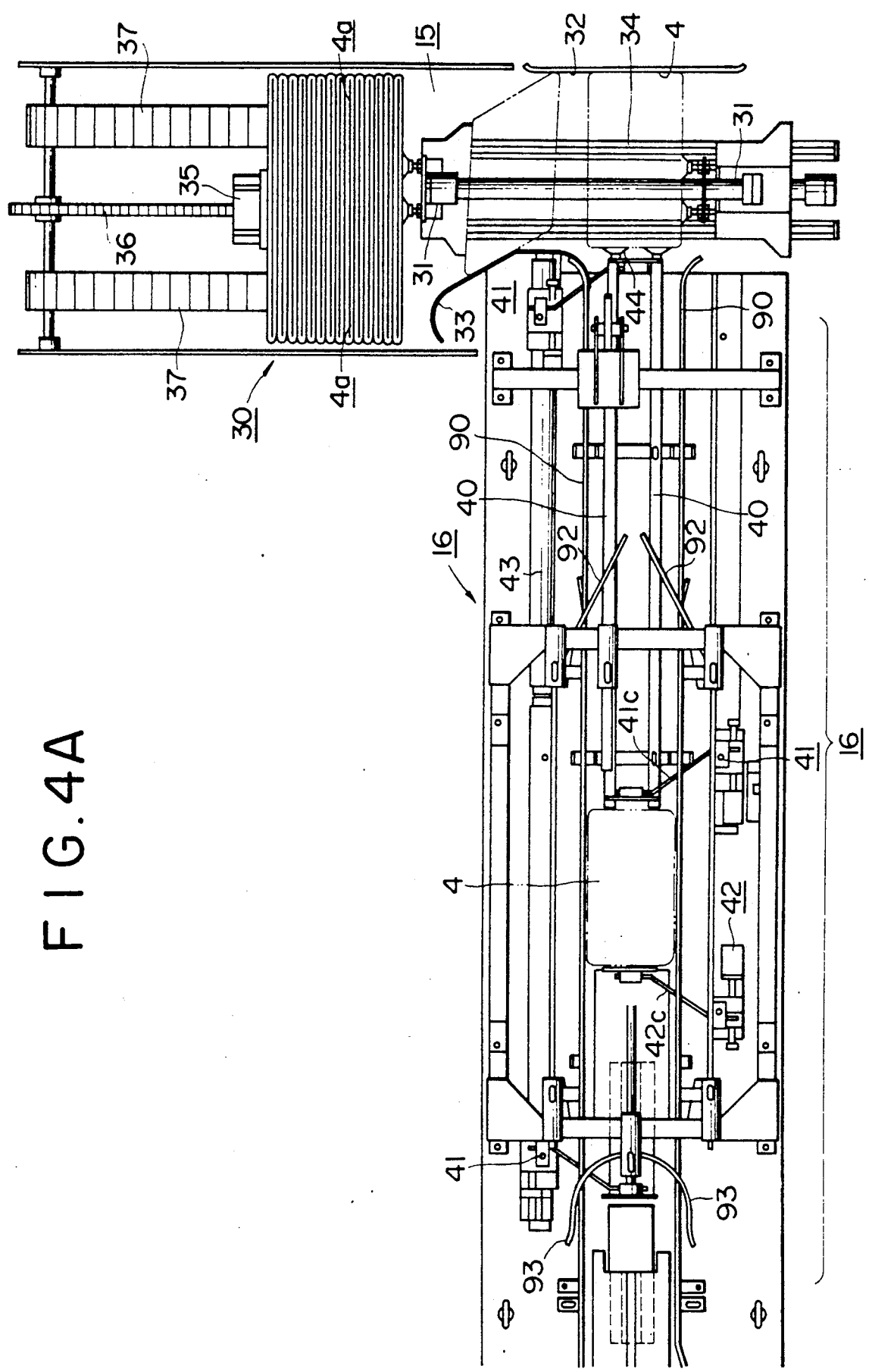
FIG. 4A is a top plan view showing an automatic carton assembler and loading mechanism for the cartons after assembled in accordance with an embodiment of this invention.
Figure 4B:
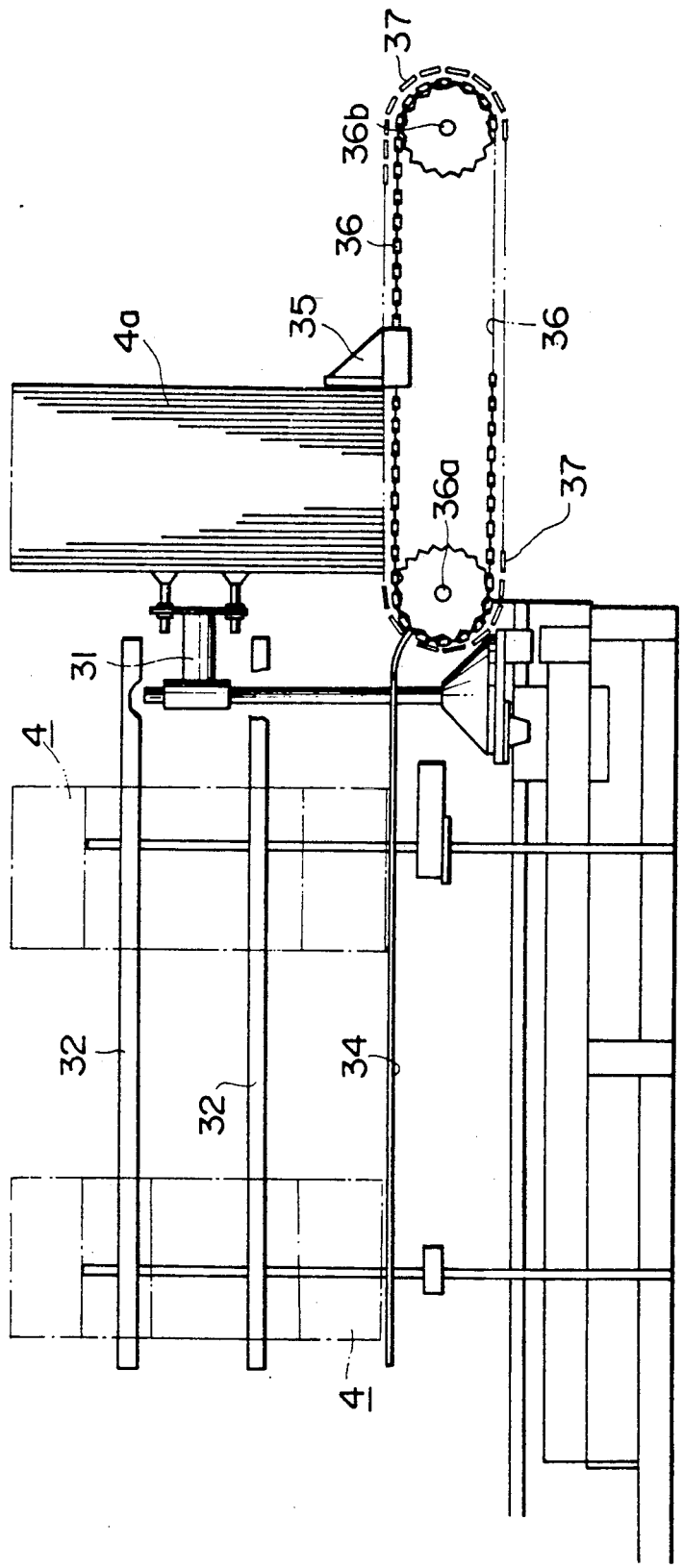
FIG. 4B is a right side elevational view of the automatic assembler of FIG. 4A.
Figure 4C:
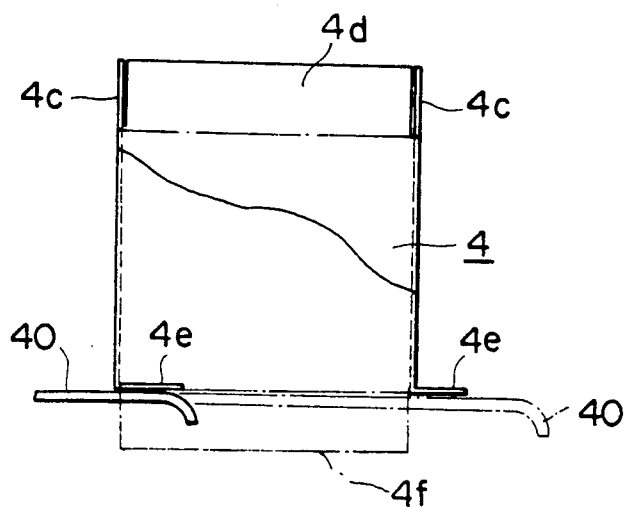
FIG. 4C is a schematic cross-sectional view showing a part of the process of folding the dust flaps of a carton in carton assembling.

As shown in FIGS. 3B and 4A-4B, many folded sheets of cartons 4a which are being glued and kept flattened are drawn from magazine 30 one by one using vacuum pads 31 which move reciprocally. At the same time, using guides 32, 33 and guide rail 34, a flat carton sheet is now assembled to a square box and then it will be guided to carton loading unit 16 which is located next to assembler 15. Numeral 35 indicates a pressure plate which pushes flattened carton sheets 4a stored in magazine 30 one by one in the direction shown by the arrow in FIG. 3A. Pressure plate 35 is attached to driving chain 36 which is connected to sprockets 36a, 36b, while said carton sheets 4a are located on catapillar 37 which moves in synchronism with said chain. Sheets 4a will be taken from magazine 30 one by one by vacuum pad 31. At that time, carton sheet 4a is assembled to form a carton box 4 by guides 32, 33, etc. FIG. 4B shows the appearance of carton box 4 after being assembled by the above mentioned method. All flaps are open vertically; however, when this carton is transferred from assembler 15 to the adjacent loading mechanism 16, flaps are bent as shown in FIG. 4C. Namely, among bottom flaps, bottom side flaps 4f are open vertically. Only bottom dust flaps 4e advance to the left in loading mechanism 16, an guide rails 40, 40 which are attached to said mechanism, in the retaining state, that is both front and rear flaps 4e are bent to the right as shown in FIG. 4C. In other words, the bottom dust flaps are bent to the right by bottom rail 40. In this way, the cartons in the opened state are loaded further by the loading unit to the inserting unit 14 which will be explained later.

Figure 4D:
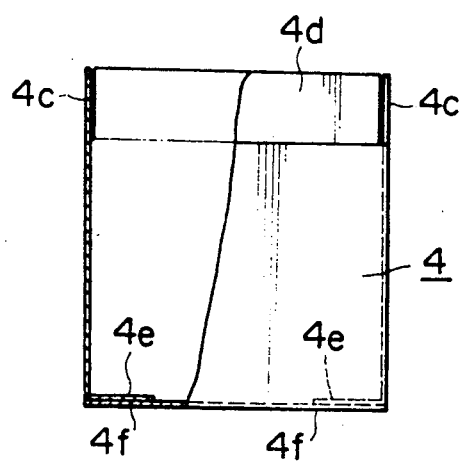
FIG. 4D is a view similar to FIG. 4C showing a bottom closed condition by conventional method without applying the special folding process of the invention.

In this connection to assemble the carton in the present invention, without applying the folding process as shown in FIG. 4C, only bottom flaps of the carton are previously closed according to the conventional method in a manner shown in FIG. 4D; thereafter, it may be introduced to inserting unit 14 through a belt conveyor as generally utilized.

CARTON LOADING MECHANISM

By referring to FIGS., 5A-5D, the operation of the carton loading mechanism in which each flap of the carton is folded one by one and transfered will be explained as follows.

Figure 5B:
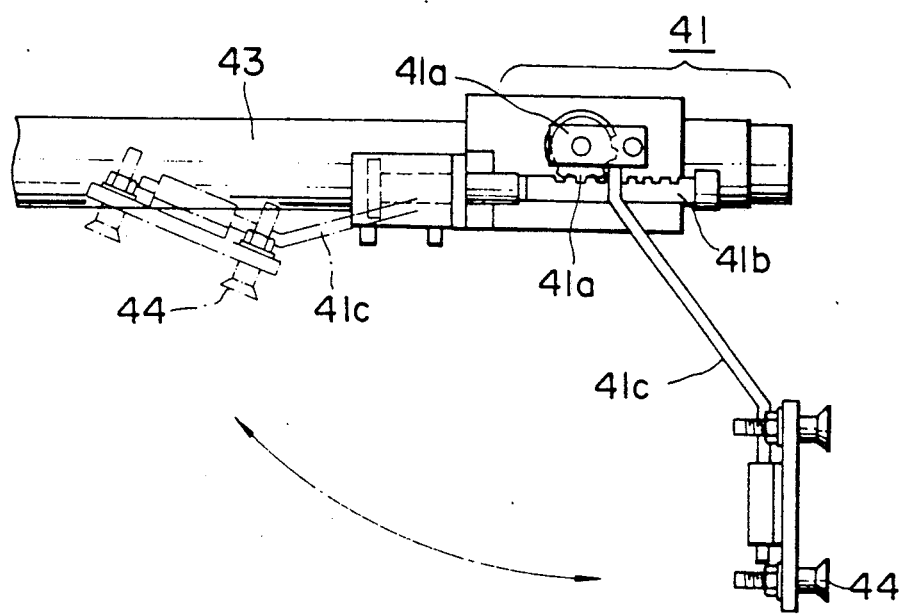
FIG. 5B is a an enlarged view of part of the driving unit of FIG. 5A.
Figure 5D:
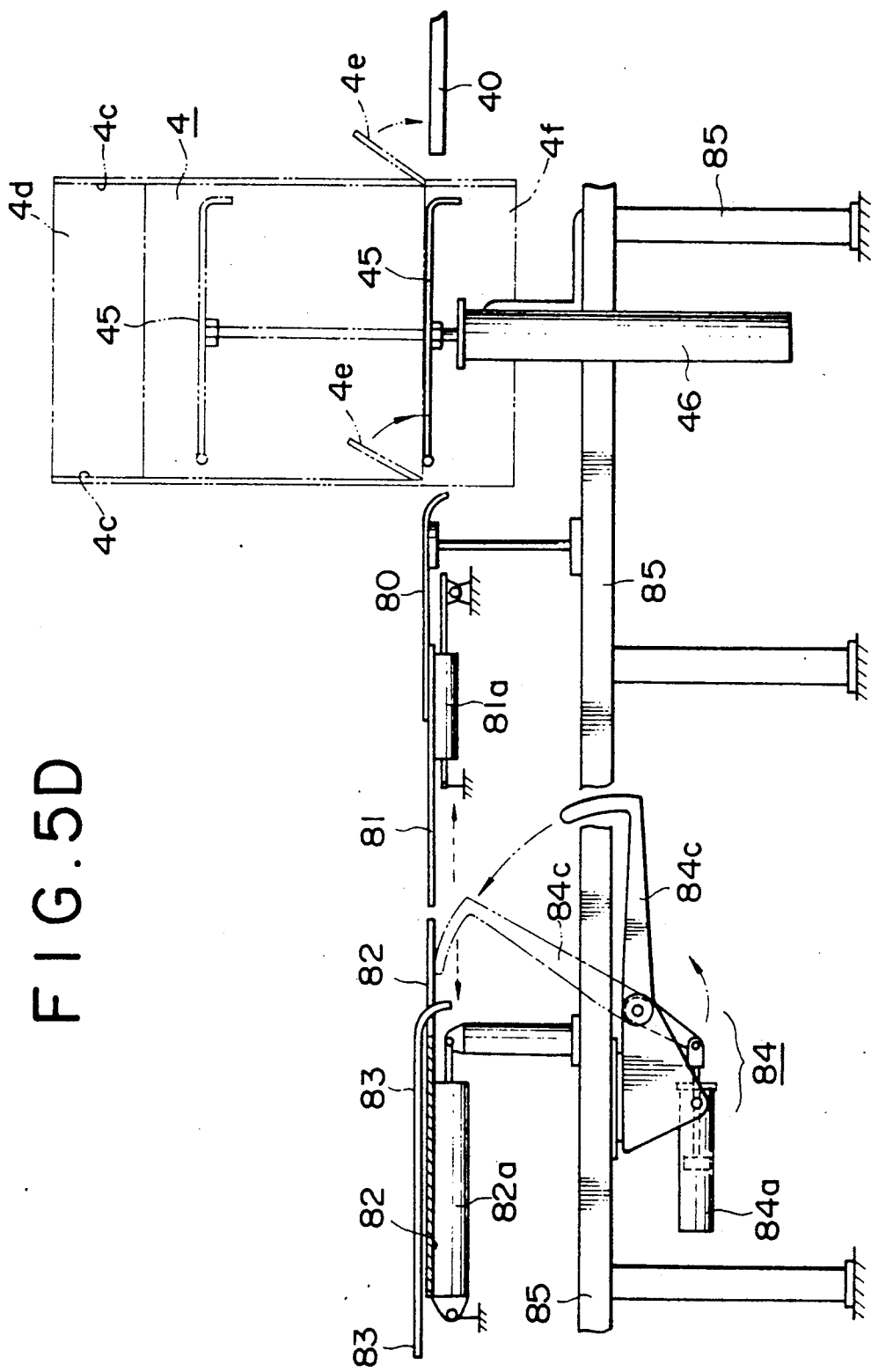
FIG. 5D is a side elevational view of FIG. 5C, partially in cross-section showing respective driving motions thereof.

The loading mechanism consist of the drives (refer to FIGS. 5A and 5B) for feeding assembled carton 4 to the left and a slider (refer to FIG. 5C). Several driving units are located at both sides of said slider as explained below. Namely, as shown in FIG. 5A, driving units (refer the numerals of 41, 42) are located at both sides of loading mechanism 16 and pull forward or push the carton 4 from behind, by using vacuum pads. These driving units make carton 4 on bottom rails 40 to move forward one by one. The said driving units, except one shown by numeral 42, move longitudinally, only the part shown by numeral 42 is fixed and does not move longitudinally. Namely, the driving units shown by numeral 41 each consist of rodless cylinder 43 which is located parallel to the longitudinal direction of the loading mechanism and swing mechanism which is fixed on the piston table of cylinder 43. The above mentioned swing mechanism as shown in FIG. 5B consists of rack 41b, pinion 41a and swing arm 41c which is driven by pinion 41a. In a typical swing mechanism, some are equipped with suction pad 44 at the working end which is located at the right hand end in FIG. 5A. FIG. 5A is a general arrangement showing where said driving units are located. Except for the fixed one, all others can move longitudinally. Swing arm 41c located on said cylinder moves to the left and right in a reciprocal motion along said cylinder as shown in the figure by rodless cylinder 43. Said swing arms 41c or 42c both make a quarter circle around the pinion shaft as shown by arrows in FIG. 5A sending the carton forward and are reset to the original position after this action. The numeral 44 indicates brake cylinder mechanism which positions said carton box to a predetermined position in the transfer path. As shown in FIGS. 5C and 5D, the end of bottom rail 40 are adjacent to support plate 45 which moves up and down within the square box. Said support plate is attached to the piston rod of cylinder 46 at the bottom thereof.

The functions of the driving units are explained as follows; a square carton, just after being assembled, is pulled on the upper surface of bottom rails 40, 40 at the most right end in FIG. 5A, while being held by suction to swing mechanism 41 equipped with vacuum pads 44. After suction pads 44 have moved a fixed distance, swing arm 41c equipped with pads 44, as shown by dot-dash arrow line in the figure, turns to make room for the carton to advance. Then other driving units 41 (shown in dot-dash lines in FIG. 5A) are activated to push said carton forward from behind. By this way the square carton which is pulled out by vacuum pad 44 on bottom rails 40 reaches the position shown as the numeral (x) in FIG. 5A. When the carton reaches the position (x), swing arm 42c of driving unit 42 which is fixed in a position and the above mentioned swing arm 41c of driving unit 41, which is movable, grab carton 4 firmly from front and behind. As shown in FIGS. 5C and 5D, support plate 45 is waiting at the position (x), and will move up within said carton by lock cylinder mechanism 46 as shown in the figure. This cylinder mechanism 46 is capable of stopping in plural steps at different heights. Said lock cylinder in the figure is variable in height by five steps in order. Thereby, products S are placed on support plate 45 and as the number of steps increases, said support plate lowers its position intermittently by using lock cylinder mechanism 46, until the carton is filled with products. As explained later, after products are tiered in five steps on the support plate 45, plate 45 is pulled out of carton 4 and located at the same height as bottom rail 40.

The above is an embodiment of a method of assembling flattened carton sheets into a square carton and transferring the carton to a packing position (x) under the open top condition thereof. The above explanation is a process to fold and transfer cartons in the state shown in FIG. 4C. The mechanism shown in FIGS. 5C, 5D is not necessary to be used, and only the mechanism shown in FIGS. 5A, 5B may be used. Therefore, the explanation made for FIGS. 5A, 5B are also referred to the assembled carton as shown in FIG. 4D. Next, the process of transferring products to said packing position will be explained.

SEPARATOR

As stated above, an embodiment of this invention features a method to form plural lines, for example three lines, with bags partially overlapping and then to placed bags stacked step by step in a carton. Accordingly it is immaterial if a separator is used or not. Bags can be fed in a single line and converted to plural lines using a separator. Or alternatively, if the bags are already fed in plural lines, it is not necessary to use a separator. However, as an embodiment of this invention, a separator which converts a single line into three lines is explained as follows.

The numeral 12 in FIG. 3B indicates the separator. Belt conveyor 11 is placed before the separator and products are supplied to separator 12 one by one through conveyor 11.

The details of each component of the separator are as shown in FIGS. 6A to 6D. The general idea is explained using FIG. 6A; products S fed from the left to the right are introduced to distributor 50, and the products in plural lines are then aligned transversely by accumulation stopper 51.

Said distributor consists of pivots 50a located at the entrance side, two distributing plates 50b, 50b which are connected to said pivots are free for rotational movement, and interconnector 50c which connects said two distributing plates and causes the following synchronized motion. Firstly in order to allow a product to go straight ahead, said distributing plates swing neither left nor right, so that a product fed in single line is distributed neither to the left or right. Alternatively switching to three positions, products fed in a single line are distributed to three lines. Once products distributed in three lines are accumulated by stopper 51, they are collectively aligned in transverse, and then fed to the succeeding centralizer.

FIGS. 6B and 6C show details of said separator, and said distributing plates 50b can take any of three positions as mentioned above, i.e. middle, left or right alternatively by driving units 50e. The distributor 50 is located on frame 50d as shown in FIG. 6B. This apparatus consists of two air cylinders (one air cylinder 50e is fixed on said frame and the other 50f is movable in relation to said frame), frames for sliding plates 52a, 52b which guide said movable cylinder 50f and sliding plate 53 which is fixed to the working end the piston rod of cylinder 50e. Said interconnector 50c is movably attached through a long hole 53a. One end of each distributing plate 50b, 50b is connected to pivot 50a which is located on frame 50d, the other ends being connected to movable shafts 50g which are connected to said interconnector 50c. As this interconnector moves, sliding plate 53 moves to and stops at the middle, left or right position alternatively, said distributing plates 50b, 50b repeating the similar movements and as a result products are distributed. As shown in FIGS. 6B and 6C, all above mentioned parts are provided on the wide belt conveyor 54.

Four driving plates 55 are located after said distributor 50. The space between said driving plates corresponds to the gap of two distributing plates. Accumulation stopper 51 which momentarily accumulates products is located at the forward end of said distributing plates. Said accumulation stopper consists of stopping plate 51b which is openable by pin 51a, cylinder 56 which opens and closes said plate, and sensors 51d to detect if 3 products are aligned at said plate position. Said stopping plate opens and closes at the signal detected by limit switches LS-1 to LS-3.

Said apparatus causes a single line of products to be converted to three lines. Products S brought in a single line by said belt conveyor 11 are fed to guide 56 on the entrance side and flow in between said distributing plates 50b, 50b. Distributing plates moving intermittently by driving unit of said cylinder 50e, 50f take firstly either left or right position then to the middle position as shown as solid line in the figure, and then to the remaining position of side, to be converted in three steps in order, so as to distribute products to be in three lines.

The first fixed cylinder 50f causes the said second movable cylinder 50e, which is attached to its piston rod, to slide. Sliding plate 53 which is attached to said movable cylinder 50e, moves transversely with belt conveyor along sliding frame 52b. Interconnector 50c moves to the left and right, resulting in a required motion.

Products distributed in three lines are not aligned at same time and therefore accumulated stopper 51 is provided at the forward end of distributing plates to align products. When three sensors 51d and limit switches LS-1 to LS-3 detect that all products are at the stopping position in each line, then cylinder 56 is activated to release said stopper and products in three lines are then unloaded from belt conveyor 54. Products unloaded from said conveyor 54 are fed onto lifter 57 and then moved to the centralizer, the explanation of which follows. As shown in FIG. 6C, said lifter 57 consists of elevation movable tray 57a, whose section is L shape and located at the end of belt conveyor 54, and cylinder 57b which supports and lifts the tray up and down. When tray 57a is empty, said tray is waiting at the same level at the unloading end of said belt conveyor 54. When products are supplied on this, a sensor which is not shown in the figure sends a signal to make said tray to move up, as shown as in dotted line, and to transfer products to vacuum pads 62, 64.

CENTRALIZER

Figure 7A:
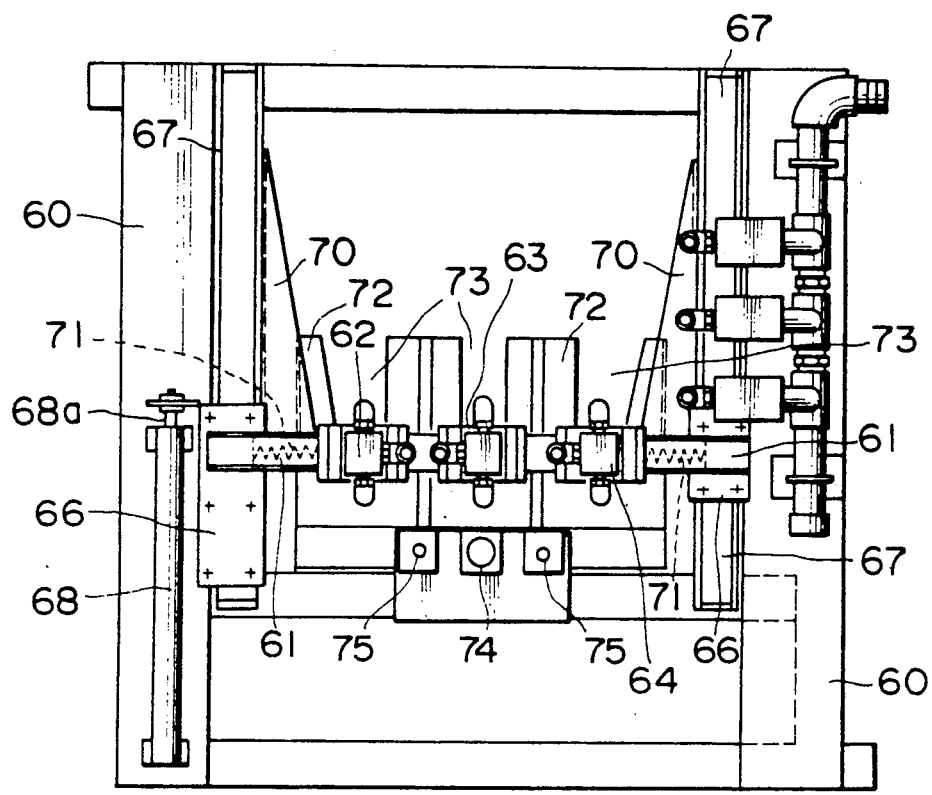
FIG. 7A is a top plan view of a centralizer for partially overlapping bags transversely fed from plural lines.
Figure 7B:
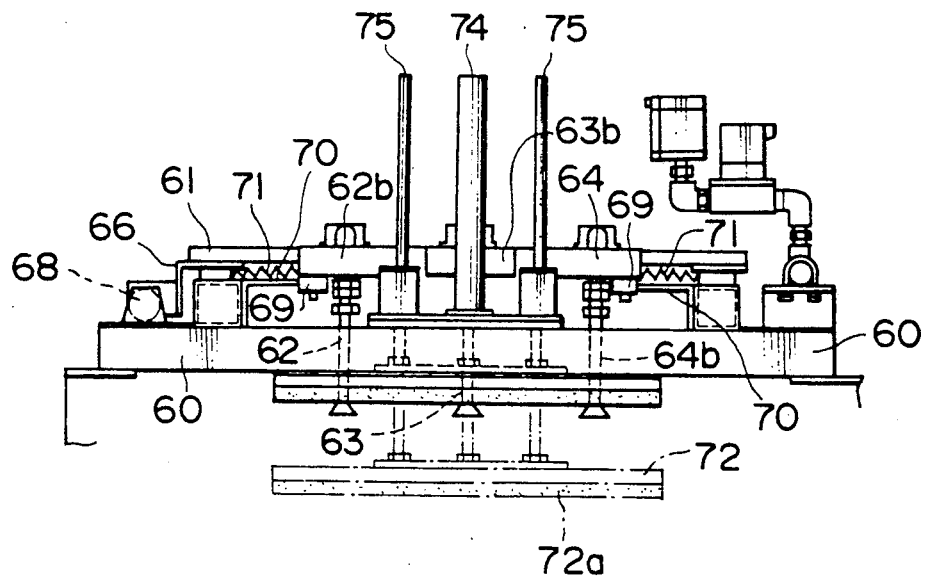
FIG. 7B is a rear elevation view of the centralizer of FIG. 7A.
Figure 7C:
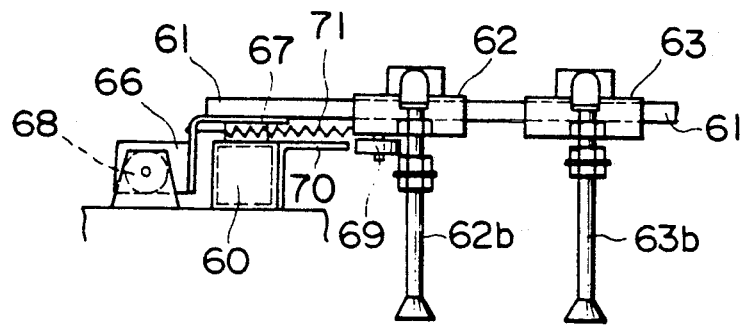
FIG. 7C is a schematic diagram showing part of the sliding mechanism of sucked bags to transverse direction.

Products on tray 57a are held and lifted up by vacuum pads which form part of the centralizer as shown in FIGS. 7A to 7C. While products are hung, products located at both sides go closer to the center until they are partially overlapped. More detailed explanation is given below. In FIGS. 7A to 7C, numeral 60 designates the frame of the centralizer, the numeral 61 designates a sliding guide rod, free movably located on frame 60.

Figure 7D:
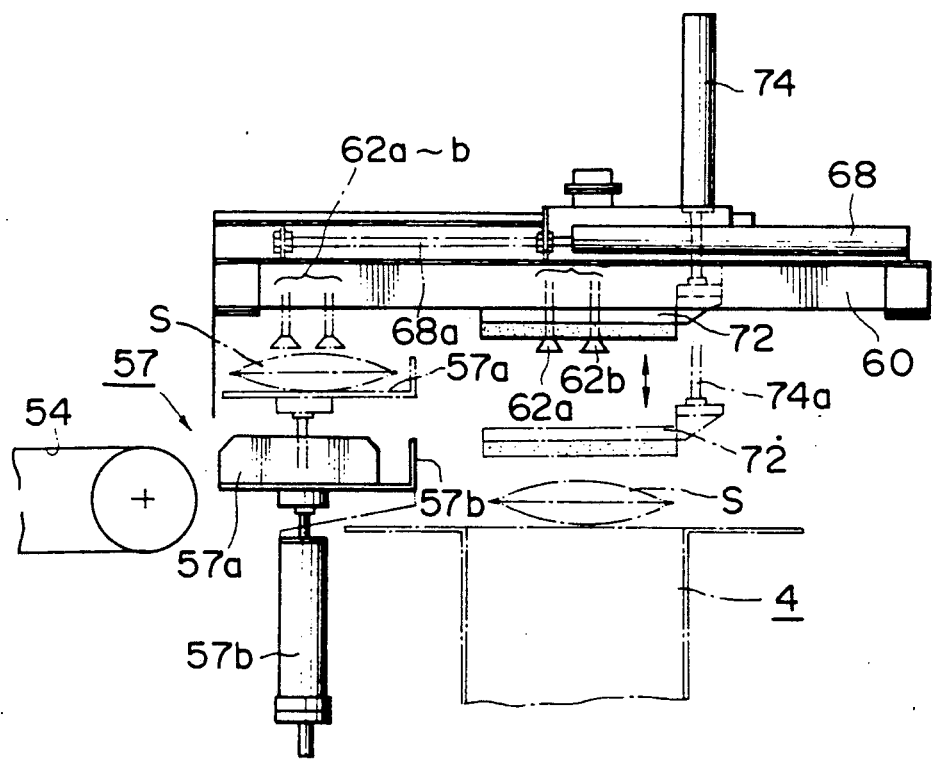
FIG. 7D is a side elevation view of the centralizer of FIG. 7A, also showing up-down mechanism of contacting plate to pack the bags forcibly into a carton keeping suction thereto.
Figure 7E:
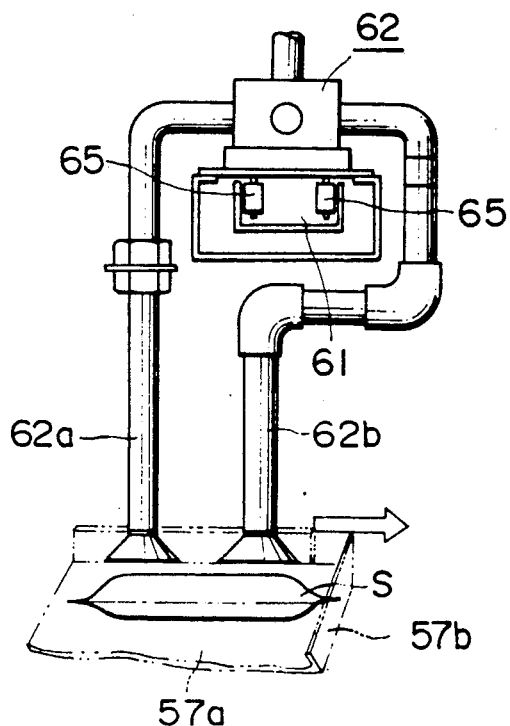
FIG. 7E is a side elevation view showing details of means for holding bags by suction.

Sliding rod 61 is located transversely of frame 60 and can slide along the direction of progression of products. Numerals 62 to 64 designate vacuum pads to individually hold said products by suction and can move perpendicularly to the direction of progression of products. In this example, as shown in FIG. 7E, this vacuum pad consists of two suction pipes across said sliding guide rod 61 and a roller bearing 65 which enables said suction pipes to slide longitudinally direction on said sliding guide rod 61. It is, in practice, immaterial if the number of vacuum pipes is one or more. Suction pads are attached at the end of vacuum pipes which directly touch products S and carry out lift up and down motions as shown in FIG. 7D. As shown in FIG. 7A, sliding guide rod 61 is located on left and right guide rails 67 which are hanging over supporting block 66. One of two supporting blocks is connected to piston rod 68a of air cylinder 68 which is fixed on frame 60. When said cylinder 68 is in motion, sliding guide rod 61 moves reciprocally on guide rail 67 parallel to the direction of progression of products. On the other hand, as stated above, three vacuum pads 62 to 64 can move along said sliding guide rod 61. Among the three vacuum pads, the one located at the center 63 is fixed to sliding guide rod 61 and vacuum pads located at both sides 62 to 64 can move longitudinally with sliding guide rod 61. Supporting block 66 which supports vacuum pads on both sides enables sliding guide rod to move along the direction of progression of products on sliding guide rail 67.

At the same time said vacuum pad 62 (same as vacuum pad 64) is equipped with roller 69 at its bottom and this roller touches cam follower 70, whose shape is triangular at the inside of guide rail 67. Spring 71 which always pulls said vacuum pads to the sides is located between vacuum pads 62 to 64 and supporting block 66 as shown in FIGS. 7A to 7C. Said vacuum pads 62 to 64 are pulled outward at all times along sliding guide rod 61. When said vacuum pads slide back and forth (along the direction of progression of products) by said cylinder 68, vacuum pads at both sides 62 to 64 converge to the center guided by cam follower 70 (when vacuum pads are advancing) or detach towards the sides (when retreating). The products inserting unit is located where said vacuum pads 62 to 64 are in the most advanced position (in position shown in FIG. 7A).

Products transferred on said lifter 57, as shown in dot-dash lines in FIG. 7D, touch vacuum pads which are waiting right above, as said lifter has been lifted up by cylinder 57b. Accumulation stopper 51b is located at the front end of said lifter which aligns the position of products at the same location. Retaining the state of being aligned of three products transversely, products will touch vacuum pads by means of the lifter. Said vacuum pads which are connected to a vacuum pump have already started suction. Therefore, as soon as products touch said pads, they will be held by suction, and are moved forward maintaining this status. Furthermore, while they are advancing, vacuum pads 62 to 64 which are located at both sides will converge to the center by the cam follower reaction. The overlapping margin can be determined by adjusting the distance between the center of the bag and the position where the bag is held by suction. Said margin can be adjusted in each application.

When centering is over at the location shown in FIG. 7A, products inserting unit shown as the numeral 14 (a solid line) in FIG. 7D is waiting to make the products to move in the following manner.

Figure 8A:
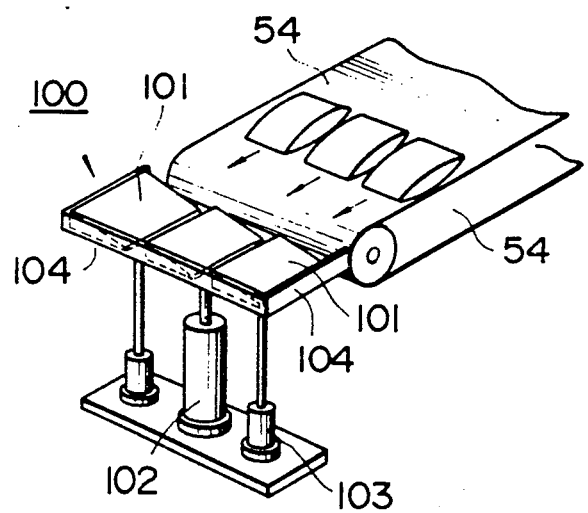
Figure 8B:
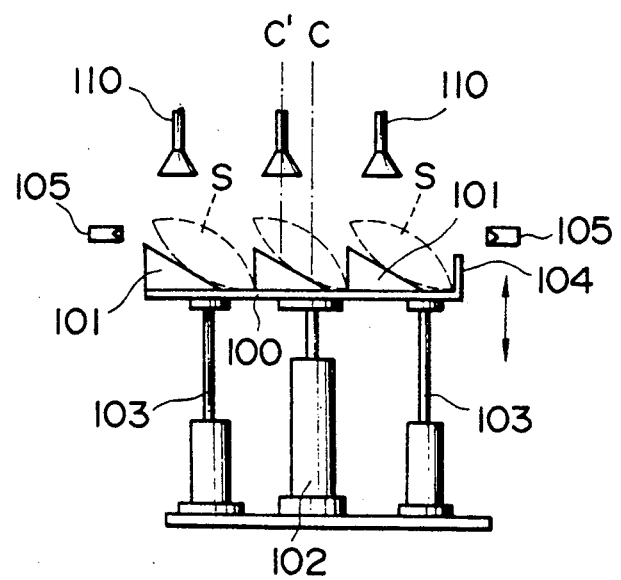

Second embodiment of product centralizer is now explained in details according to FIGS. 8A, 8B. In this embodiment, elevation movable wave shaped table 100 is provided at exit side (unloading end) of belt conveyor 54 shown in FIG. 6C, and transversely aligned products fed through said conveyor 54 are transmitted onto this table. As shown in FIG. 8B on said table 100, pillow plate 101 of which number corresponds to the products number to be fed are secured in inclined state so that all transmitted products onto said table become automatically oriented with same inclination along with said pillow plates. Underneath of said table 100, air cylinder 102 is provided to direct the up-down motion of said table, and guide rods 103, 103 are fixed on both sides of said cylinder 102. For prevention from fallen off the transmitted products onto said table, plain view of L-shaped flange plate 104 are protruded on the edge end of said table 100. Further, on slightly upper portion of both sides of said table, position sensor 105 such as photo sensors are provided to detect the table position as to whether it ascends to proper position.

On other hand, on the upper portion of said wave shaped table 100, vacuum pads 110 are provided to suck and transmit products placing on the table. Although the structure and function of these vacuum pads are briefed later, the important matter here is that the layout of these vacuum pads 110 should be made at some extent off-center from the center line C of product S, more precisely at position where leaned more higher position (as shown on dotted line as C' in FIG. 8B) of the inclined pillow plates on the table. Under such structure, when products S are transmitted onto the wave shaped table 100 through conveyor 54, such products are placed on the table as inclined in compliance with the inclination of said pillow plates 104. At same time, position sensor 105 stand by at upper portion of said table, thereby the existence of products on said table are confirmed, and said table 100 is lifted up by the motion of air cylinder 102 with the confirmation signal. On the upper part of the table 100, as mentioned above, vacuum pads 110 are waiting while keeping suction state thereof, and then they contact and suck said products S by suction effect. As aforementioned, operation line C' of vacuum pads is leaned from center line C of products in the direction of up and down, therefore they are transfered to succeeding process of products packing, while they are in the condition that such sucked products are kept inclined and simultaneously they are partially overlapped each other.

As described above, by using an apparatus shown in FIGS. 8A, 8B, it makes possible to have easier mechanical structure and shorter time of partial overlapping of product each other compared with the embodiment explained in accordance with FIGS. 7A to 7H.

PRODUCTS INSERTING UNIT

Figure 7G:
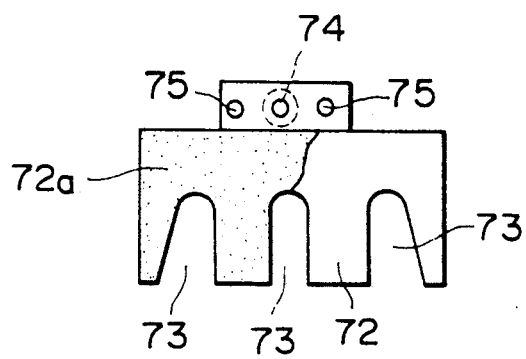
FIG. 7G is a plain view showing the underneath of said contacting plate.
Figure 7F:
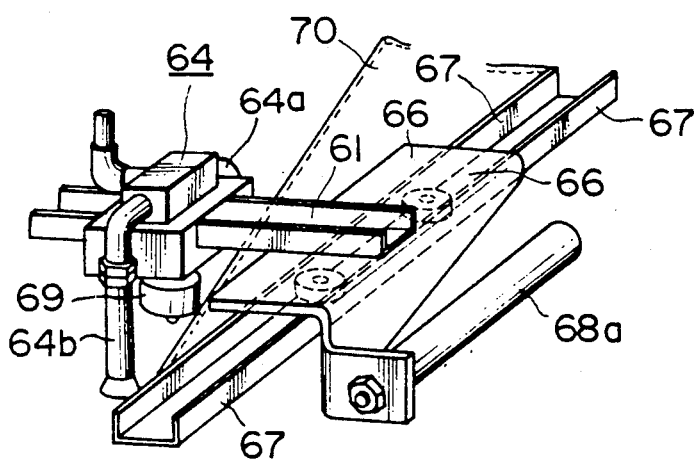
FIG. 7F is an isometric view showing a cam mechanism which makes said means for holding bags by suction to slide transversely.
Figure 7H:
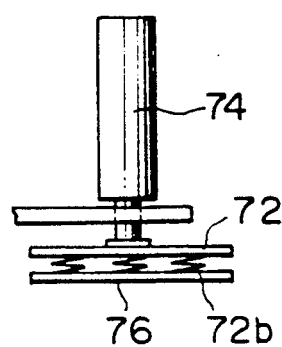
FIG. 7H is a side elevation view showing an another embodiment of the contacting plate.

Products inserting unit is located, as shown in FIGS. 7D and 7G, where vacuum pipes (62a, 62b etc) come to the end. Said inserting unit consists of vertically equipped cylinder 74 and contacting plate 72, which lifts up and down by means of said cylinder 74. Said contacting plate have incisions 73, 73 which enable vacuum pipes of vacuum pads 62 to 64 to enter. Numeral 72a designates a vibration absorption rubber attached on the surface where products touch, in order not to damage the contents when products are placed inserting. However it is not essential to use the vibration absorption rubber. It is also possible to use compressed springs 72b (FIG. 7H) between inserting plate 76 and contacting plate 72 as an alternative measure to avoid damage caused by impact when inserting products. Numeral 75 designates guide rod for cylinder 74.

Contacting plate 72, by cylinder 74, retain products detaching them away from vacuum pads 62 to 64 so as to press products from above softly, then placed products inserting into the square carton 4 positioned just below thereof. Suction of vacuum pads is released as soon as the contacting plate 72 starts to move down by electrical signal.

The above is the process in which three products are centralized, made to partially overlap and packed in a carton. Within said carton, support plate 45 has been lifted up as shown in FIG. 5C, and products are placed through contacting plate 72 forcibly on this plate.

PACKING PROCESS

Products in three lines and being held by vacuum pads 62 to 64 as stated above are centralized and come closer while they are advancing, and depending on the necessity, they are partially overlapped. Since this embodiments enables the operator to choose a position where products is held by suction, an optimum overlapping margin can be obtained, depending upon types, weight and size of products.

Figure 9A:
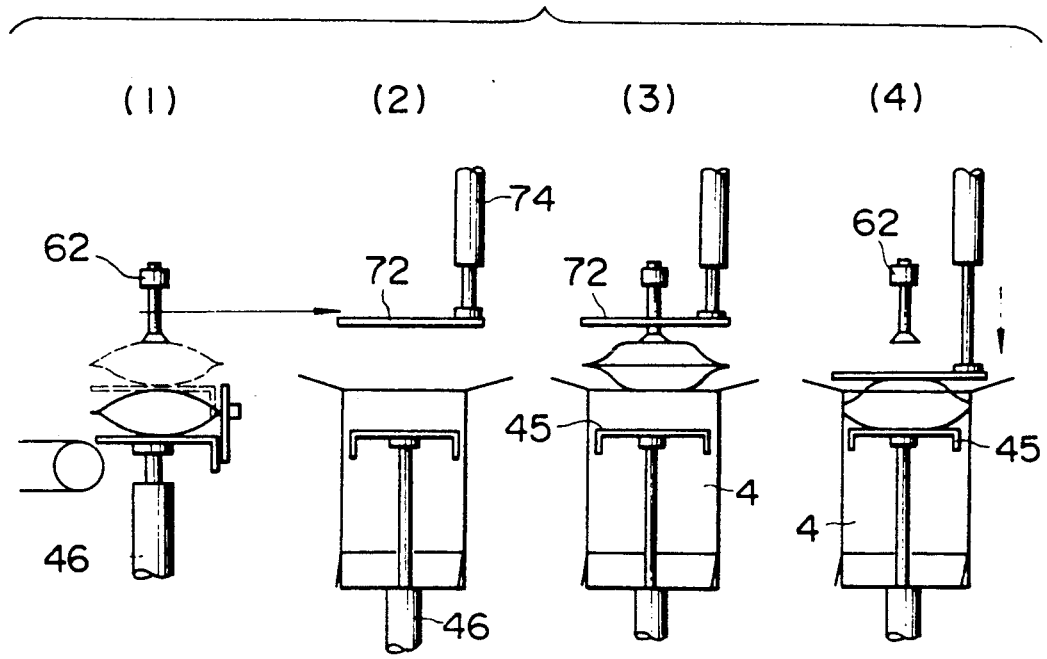
FIGS. 9A (1) to (16) are the schematic diagrams showing how bags are tiered in multiple steps.
Figure 9A:
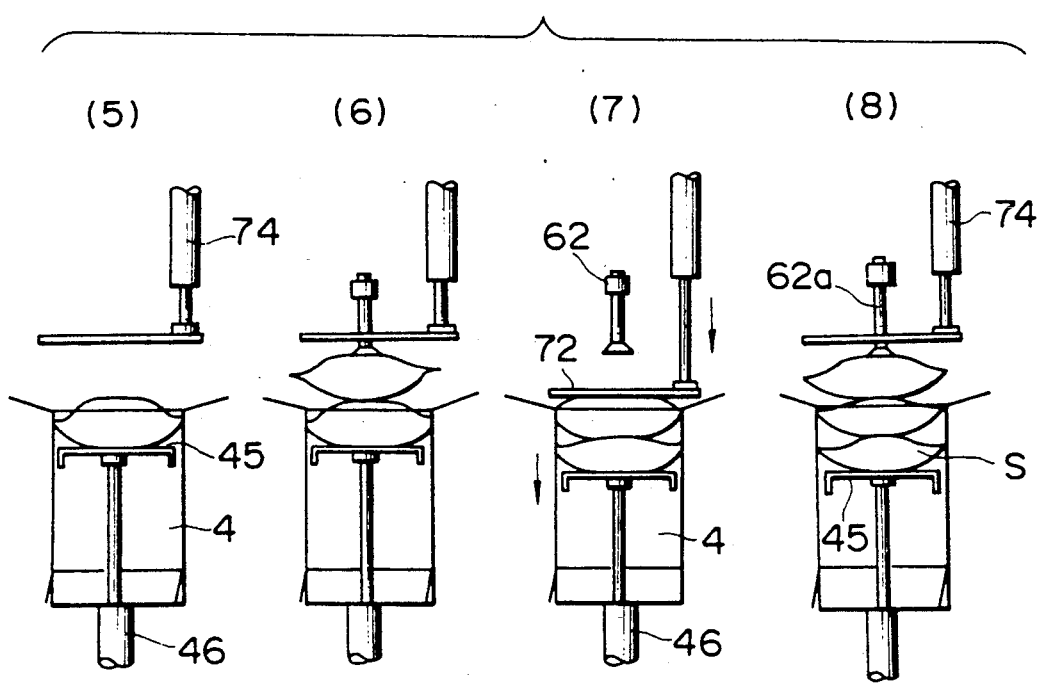
Figure 9A:
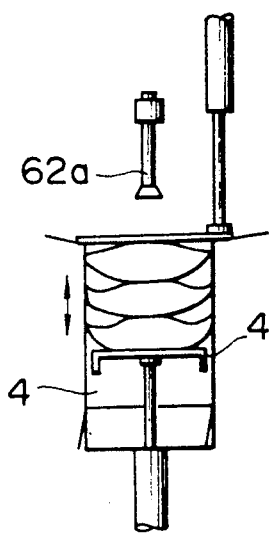
Figure 9A:
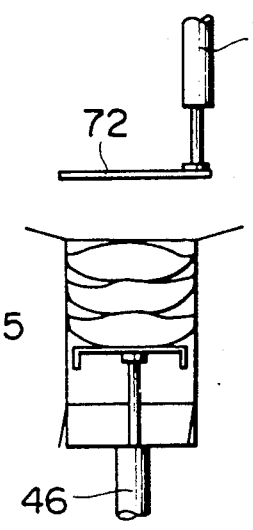
Figure 9A:
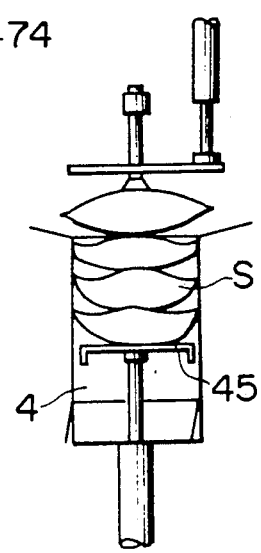
Figure 9A:
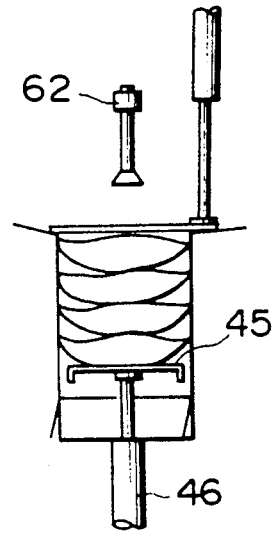
Figure 9A:
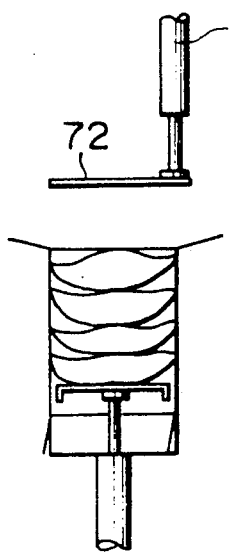
Figure 9A:
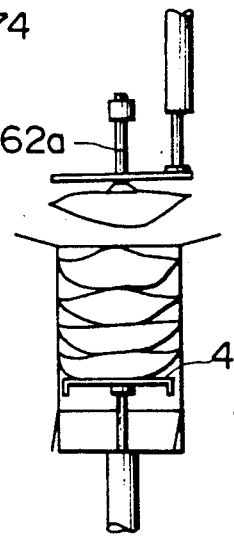
Figure 9A:
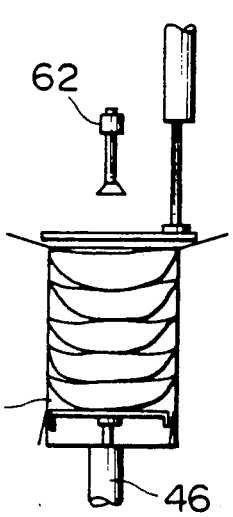
Figure 9A:
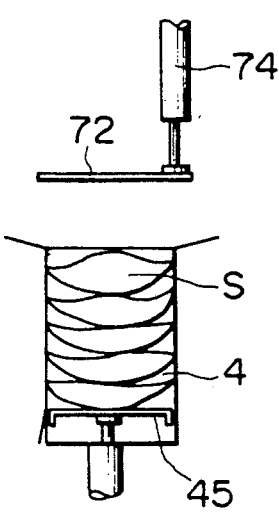

The position where products are inserted into carton 4, as shown in FIG. 7D, is the position (X) as previously explained with reference to FIGS. 5C, 5D. FIGS. 9A (1) to (16) schematically show the process by which products are packed in this position. When products are centralized above carton 4, supporting plate 45 has already been lifted up and products are forcibly retained by contacting plate 72 on this plate into carton as can be seen in FIGS. 9A (3), (4). After the first step of products are tiered, the support plate 45 is lowered gradually by a stepping air cylinder (or alternatively a lock cylinder may be used) located underneath. When the second step is tiered, the plate 45 moves further down and more steps of products are tiered thereto.

SEALING OF CARTON

After a predetermined steps of products are tiered into carton 4, which has been in the position (X), said carton will be pushed to the left to the position (Y), as swing arm 41a of driving unit 41 which is located on rodless cylinder 43, as shown at upper left hand in FIG. 5A, is activated and swing arm (42a) of fixed positioned driving unit 42 which is located underneath is released as shown in dot-dash line. At the position (Y), brake cylinder 44 stops and fixes carton 4 and afterwards bottom flaps closing motions will be carried out. Namely, said support plate 45 is pulled out from carton 4 and kept the same level with bottom rail 40. Among the four flaps extending from the bottom of carton 4, dust flaps 4e which are perpendicular to the direction of progression of products will be folded in the following manner. As stated above, carton 4 is moved to the left in FIGS. 5A to 5D. Of the two dust flaps, the front dust flap is simply folded by pulling support plate 45 from carton 4. The remaining dust flap needs to be folded to the opposite direction. This folding mechanism will be explained. In the embodiment referring to FIGS. 7A–7H and 10 to 12, as shown in FIGS. 5C, 5D, induction plate 80 is provided adjacent to support plate 45, and slide type of guide plate 81 whose driving source is cylinder 81a is provided underneath said induction plate to be partially overlapped each other. Similar slidable adjusting plate 82 is also provided at end part of guide plate 81, which will be driven by cylinder 82a. Bottom plate 83 to be covered by said slidable adjusting plate 82 is provided in such a manner that adjusting plate 82 can be come appeared from under bottom plate 83. When both guide plate 81 and adjusting plate 82 are faced each other at the position of stand back as shown in dotted arrowed in FIG. 5D, bottom kicker to folds said dust flap, spring out in that space between said guide plate 81 and adjusting plate 82. Cylinder 84a is attached to frame 85, and flap folder 84c is engaged with piston rod 84b of said cylinder.

This embodiment includes means for folding upper rear dust flap 4c of carton 4, using a similar mechanism as already explained above. Refer to upper kicker 86 in FIG. 10.

Figure 10:
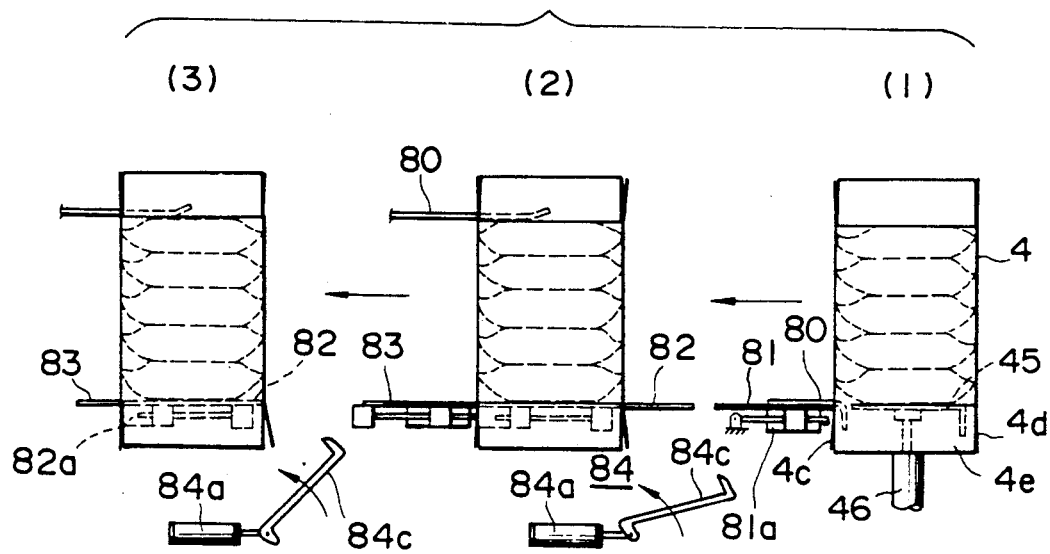
FIGS. 10 (1) to (6) are schematic diagram showing the order of folding side flaps and dust flaps of the carton.
Figure 10:
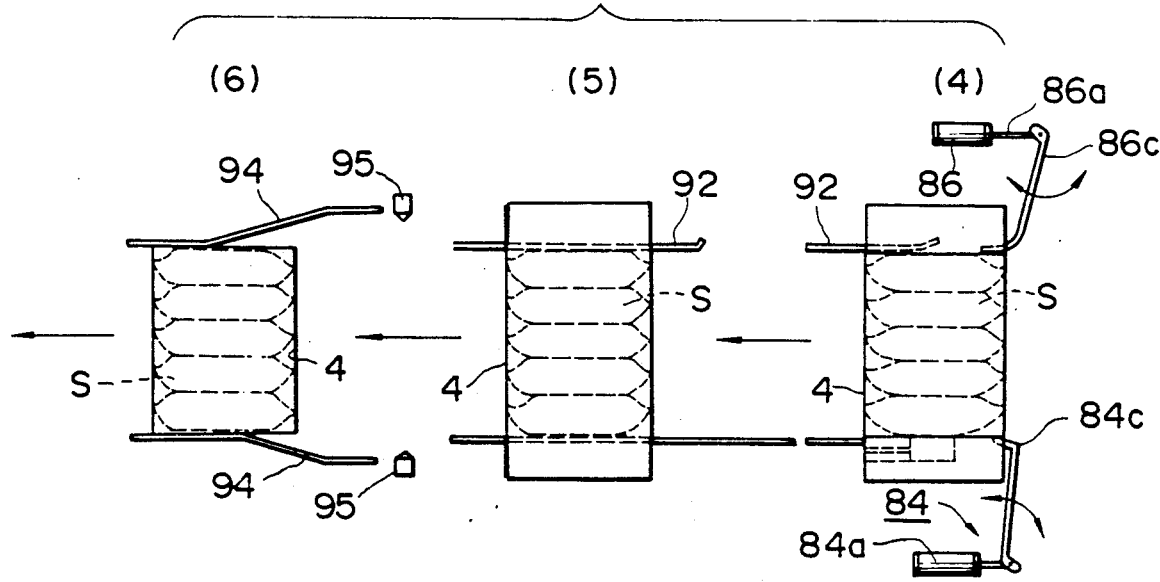

Carton 4 is transferred from left to right one by one as shown in FIG. 5A using driving unit 41 and rodless cylinder 43. The rear bottom dust flap of said carton is folded on the way to transfer in the following manner. Firstly the front dust flap is folded taken by advance of carton 4 to the left, while it is sliding on fixed position of induction plate 80, protruded condition of guide plate 81, same protruding condition of adjusting plate 82, and fixed bottom plate 83. When said flap passed on protruded guide plate 81 and adjusting plate 82, these guide plate 81 and adjusting plate 82 stand back to inside gradually, as shown in dotted arrow in FIG. 5D and FIG. 10 so as to create the sufficient space between plates 81 and 82 to hang down the rear bottom dust flap. When the bottom rear dust flap 4e hangs down, arm 84c of kicker 84 folds said flap 4e, by means of its cylinder 84a at high speed, as shown in FIGS. 10 (3), (4). Folded flaps advance, retaining this state, by guide of bottom plate 83 etc which are located under said carton, keeping products within carton 4 and preventing them from falling off. Upper rear dust flap 4c is folded in a similar manner by kicker 86 in FIG. 10.

Figure 11:
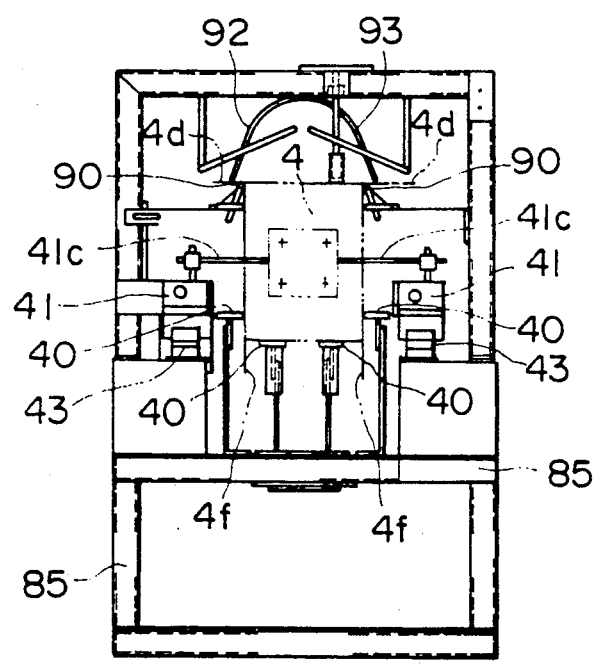
FIG. 11 is a side elevation view showing means for folding said side and dust flaps of the carton.
Figure 12:
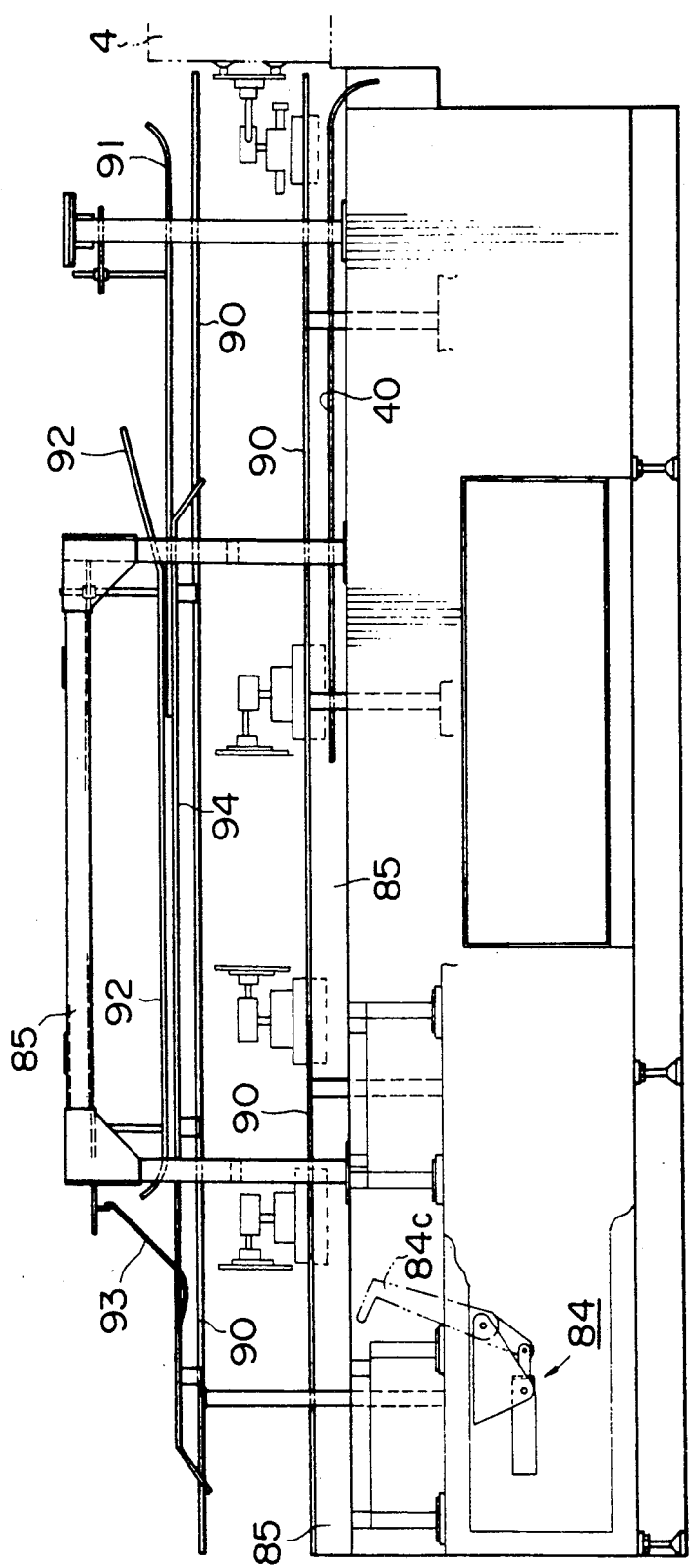
FIG. 12 is a rear view of FIG. 11.

Thereby each two of front and rear flaps 4e, 4e on both upper and bottom end of carton 4 are bent towards the desired direction. Meanwhile side flaps 4d, 4f of said carton are also bent and closed towards a predetermined direction by fixed guides 90-93 on the way of loading thereof as shown in FIGS. 11 and 12. Hot melt glue guns 95, 95 located above and under the transfer passage are used to glue and seal the carton.

ANOTHER EMBODIMENT FOR METHOD AND APPARATUS FOR PACKING FLEXIBLE PACKAGES

Other than embodiment shown in FIGS. 7A to 7H and 10 to 12, the following apparatus can be available to perform the present invention. Namely by using an apparatus shown in FIGS. 8C, 8E, it is possible that the conveyor unit shown in FIGS. 5A, 5B can be combined used thereto, which is now described.

Figure 8C:
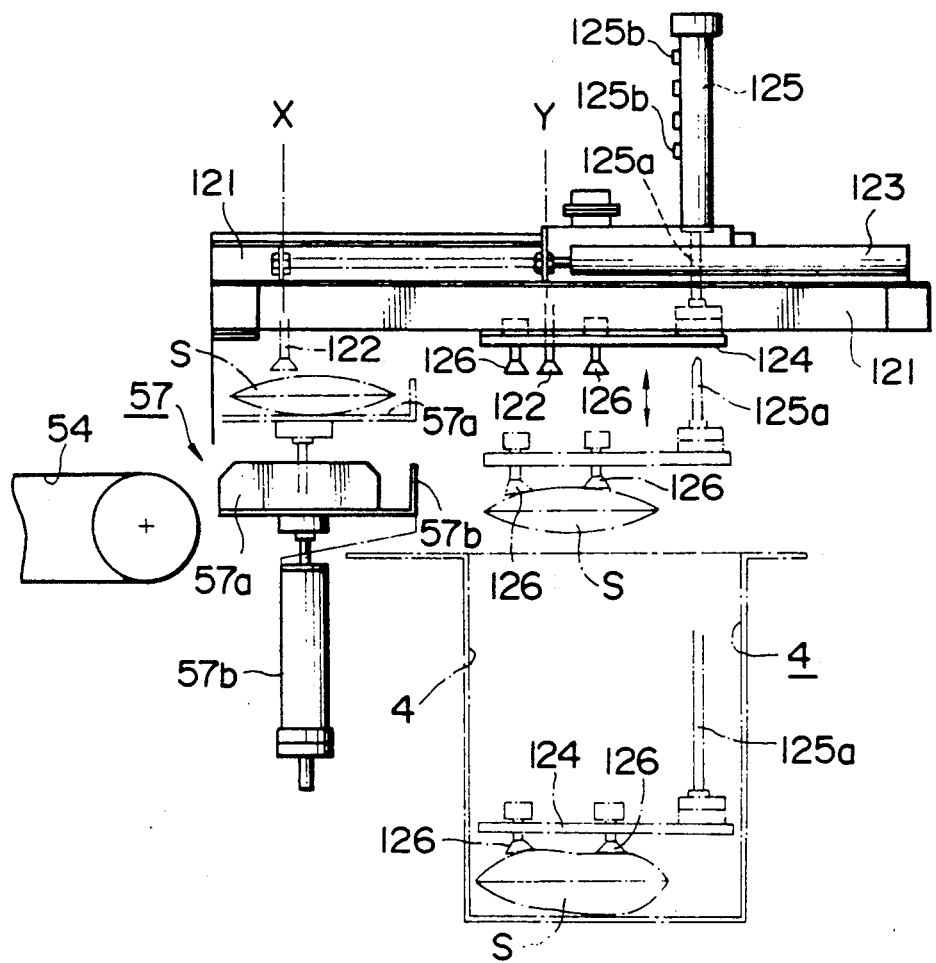
Figure 8D:
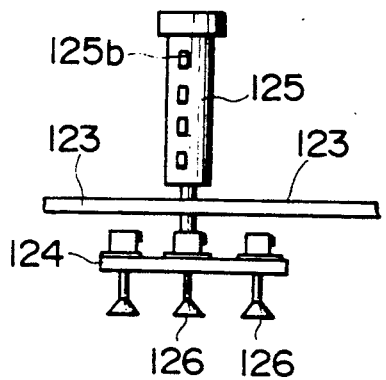
Figure 8E:
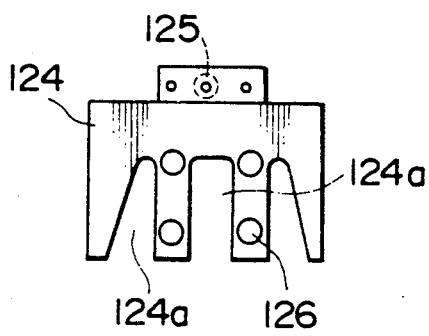

Upper portion of lifter 57 in FIGS. 8C to 8E, horizontally extending guide frame 121 is provided so as to cover the immediate above said lifter by top end of said frame. To such guide frame 121, vacuum pads 122 is mounted having same mechanism as shown in FIG. 7E and having reciprocative motion between (X) point and (Y) point in the drawing along with longitudinal direction of cylinder 123 which is mounted to said guide frame. At (Y) point, transfer plate 124 is provided for the purpose of transfer stacking with up-down motion but the position of horizontal direction thereof is fixed. Such up-down motion of said transfer plate is given by vertical shape of stepping air cylinder 125 (also called as lock cylinder) which is mounted to guide frame 121 as shown in the drawing. As to said stepping air cylinder 125, the stroke of piston rod 125a thereof are adjustable by adjusting the number and location of reed switch 125b which is mounted on outer periphery of said cylinder, to make variable motion of stroke of said piston rod gradually and periodically. In the present invention, it makes possible that products can be arranged in tiers in a carton as stacked in multiple steps by using said stepping air cylinder or lock cylinder 125 by means of stroke of piston rod 125a thereof are varied gradually and periodically.

By the way, plain view of said transfer plate 124 has bear hand shape (glove shape), and total 3 indents 124a are formed at center and both sides thereof to insert said vacuum pads 122. Further, underneath of said transfer plate 124, plural number of vacuum pads 126 are mounted with different type than said vacuum pads 122 with elevation movably in some extent toward up-down direction through small air cylinder 126a which is mounted to said transfer plate. Then, as shown in FIG. 8C, products S placed on lifter 57 are once lifted up by transversely reciprocatively movable vacuum pads 122, products are transferred to the exact below position of transfer plate, and when products reached to the exact below position of transfer plate, they are sucked by another vacuum pads 126 which is mounted to said transfer plate. Namely, before products S come to the exact below position of transfer plate, vacuum pads 126 which are previously located underneath of said transfer plate are slightly lifted up through small air cylinder 126a, and when products reached to the exact below position of transfer plate, said pads 126 are lowered toward below, and then suction to products are applied.

Thereafter, the suction of horizontally movable vacuum pads 122 are released, and products are transmitted to below side of transfer plate 124.

Figure 9B:
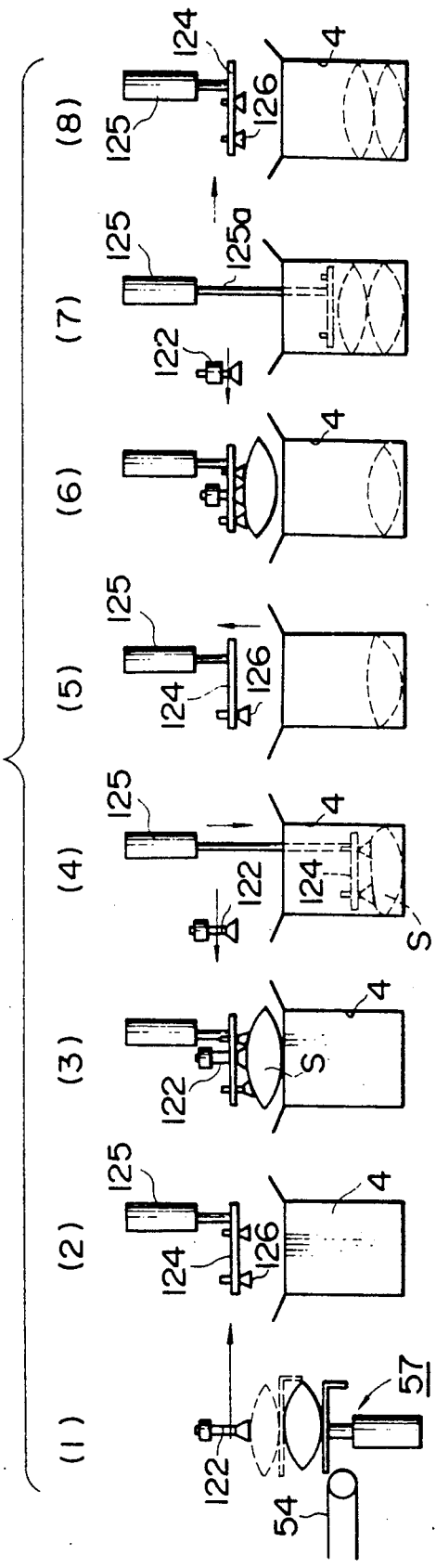
FIG. 9B are the schematic diagrams showing the process to tier the bags in the carton using a packer shown in FIGS. 8C to 8E.
Figure 9B:
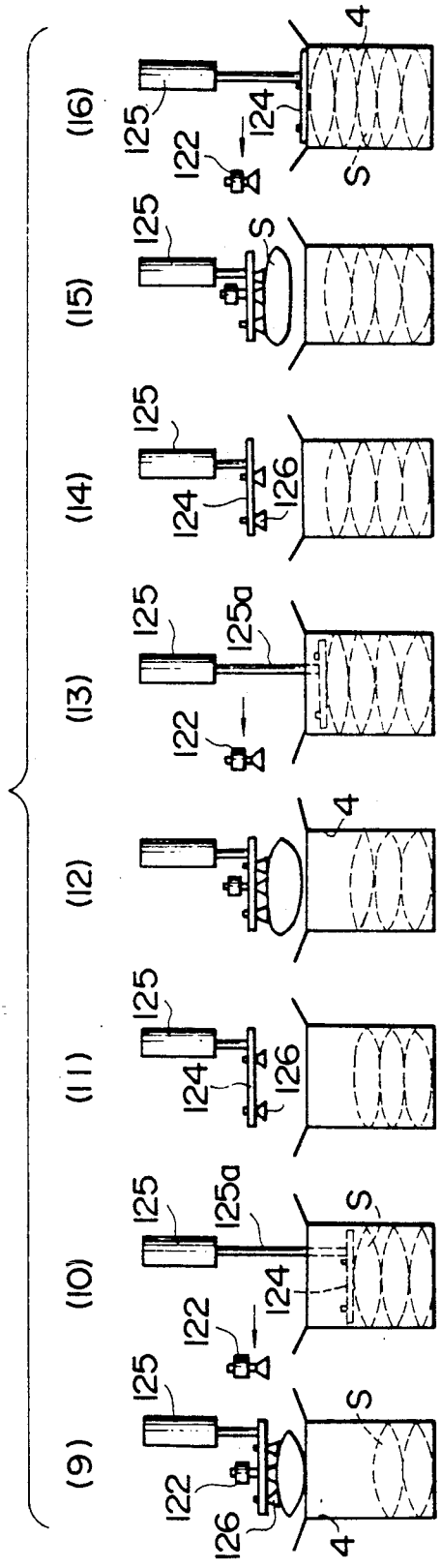

Thus, products sucked to below side of transfer plate are lowered with a whole transfer plate, as dotted line shown in FIG. 8C, by reaction of stepping air cylinder 125 which is mounted to said transfer plate, and products are quietly inserted into an open top carton of exact below position, whereby natural dropping is precluded. Details are shown in FIGS. 9B (1) to (16), when products are placed at the lowest step in a carton (see said (1) to (4), in the succeeding process of said (5) to (8), the stroke of piston rod 125a of stepping air cylinder 125 is set, by limit switch (illustration was omitted in the drawings but it is mounted to transfer plate) to detect the height from bottom of carton, to be shorter than above process of said (1) to (4), so that succeeding products can be quietly stacked onto the lowest step. In such manner, products are stacked in a carton step by step, and when certain steps were stacked (in case of example of drawing is 5 steps) in a carton, it is then unloaded as per motion described in referred to FIGS. 5A, 5B. Subsequently, new carton is fed to exact below position of said transfer plate 124 and start with the process motion of FIG. 9B (1) to (4) and so repeated these such in order, thereby packing products into a carton are going on.

As per above, by using packing apparatus shown in FIGS. 8C to 8E, it is not necessary to insert the support plate (see numeral 45 in FIG. 9A) into a carton during the packing operation, therefore bottom flap 4e for carton can be closed prior to the products packing operation. Designated numeral Q in FIG. 3A of carton assembling flow chart of schematic drawing means the case of carton which bottom flap were previously closed to where products are packed.

It should be understood that, in the description referred to FIGS. 8C to 8E and 9B, lifter is exemplified as shown by numeral 57, however, substituted for this lifter, elevation movable wave shaped table 100 shown in FIGS. 8A, 8B may be used.

VARIATION OF EMBODIMENT OTHER THAN ABOVE

In the above mentioned embodiment, driving units expressed to as cylinder means the air cylinder typically, but oil pressure, hydraulic or any other pressure source may be used. Electric motors can be used as a driving means.

A vertical pillow type bag filling machine may be installed at before process of loading conveyor 11 mentioned in the above embodiment, synchronizing with weighing gauge to align bags converting single line thereof into plural lines after bags are sealed while weighing snack food and bagged.

Although a means for converting plural lines of bags from single line fed through loading conveyor are disclosed in details, it is not always necessary to use this meanes for centralizer. For example, if products are already fed in three lines, products can be directly fed to centralizer without using separator.

It will be recognised by persons skilled in the art that numerous variations and modifications may be made to the invention as described above without departing from the spirit of scope of the invention as broadly described.

We claim:

1. Method for packing flexible packages in a carton comprising:

feeding a plurality of packages in a feeding direction;

aligning a plurality of said packages being fed in a row extending substantially transversely to said feeding direction;

centralizing said row of packages so that adjacent packages in said row partially overlap each other in a centralized position;

positioning an open top carton adjacent said centralized position;

engaging said overlapped packages with vacuum pads;

transferring said overlapped packages by said vacuum pads from said centralized position to a position over said carton;

removing said overlapped packages in said overlapped position from said vacuum pads;

lowering said overlapped packages into said carton in said overlapped position without dropping said packages by gravity while simultaneously returning said vacuum pads to said centralized position for engaging further overlapped packages; and continuing said steps in series to fill said carton in tiers of overlapped packages.

2. The method as claimed in claim 1 wherein:

said lowering step comprises supporting said packages for intermittent lowering movement and simultaneously urging said packages into said carton.

3. Apparatus for packing flexible packages in a carton comprising:

means for arranging a plurality of packages in plural feed lines in a feeding direction;

means for aligning a plurality of said packages in said feed lines into rows of packages extending substantially transversely to said feeding direction;

means for centralizing said packages by displacing said packages in each row with respect to each other so that adjacent packages overlap in a centralized position;

means for feeding open top cartons to be loaded with packages to a carton loading position;

vacuum transfer means engageable with said packages for engaging said overlapped packages by vacuum and transferring said packages from said centralized position to said carton loading position over said open top of said carton;

means for engaging said packages in said overlapped position with said vacuum transfer means;

support means in said carton and removable therefrom for supporting each row of overlapped packages;

means for removing said overlapped packages from said vacuum transfer means over said open top cartons and for urging said overlapped packages onto said support means; and means for raising said support means in said carton and intermittently lowering said support means in stages so that said overlapped packages are positioned on said support means without dropping by gravity and said overlapped packages are stacked in tiers in said carton.

4. Apparatus as claimed in claim 3 wherein said vacuum transfer means comprises:

suction cup means engageable with said packages; and first fluid pressure operated means connected to said suction cup means for moving said suction cup means between said centralized and carton loading positions in an oscillating manner.

5. Apparatus as claimed in claim 4 wherein said package removing means comprises a slotted plate member for receiving said suction cup means in the slots thereof; and second fluid pressure operated means for reciprocating said slotted plate member.

6. Apparatus as claimed in claim 4 wherein:

said support means comprises a support plate member; and said means for raising and lowering said support means comprises third fluid pressure operated means connected to said support plate member synchronized with said vacuum transfer means so that said third fluid pressure operated means is intermittently operated when said suction cup means are returned to said centralized position.

7. Apparatus as claimed in claim 5 wherein:

said support means comprises a support plate member; and said means for raising and lowering said support means comprises third fluid pressure operated means connected to said support plate member synchronized with said vacuum transfer means so that said third fluid pressure operated means is intermittently operated when said suction cup means are returned to said centralized position.

8. Apparatus as claimed in claim 4 and further comprising:

package conveyor means for supporting and conveying said packages in said feeding direction and having an outlet end; and wherein:

said means for engaging said packages with said vacuum transfer means comprises a further plate member adjacent said outlet end of said conveyor for receiving packages therefrom at said centralized position, and fourth fluid pressure operated means connected to said further plate member for raising packages thereon into engagement with said vacuum transfer means and returning to a package receiving position.

9. Apparatus as claimed in claim 7 and further comprising:

package conveyor means for supporting and conveying said packages in said feeding direction and having an outlet end; and wherein:

said means for engaging said packages with said vacuum transfer means comprises a further plate member adjacent said outlet end of said conveyor for receiving packages therefrom at said centralized position, and fourth fluid pressure operated means connected to said further plate member for raising packages thereon into engagement with said vacuum transfer means and returning to a package receiving position.

* * * * *